US009955671B1

(12) United States Patent
Turocy et al.

(10) Patent No.: US 9,955,671 B1
(45) Date of Patent: May 1, 2018

(54) ANIMAL TRAINING AND INDICATING DEVICE

(71) Applicant: Kenneth R. Turocy, Wadsworth, OH (US)

(72) Inventors: Kenneth R. Turocy, Wadsworth, OH (US); Dustin C. Boley, Canton, OH (US); William D. Beskitt, Canton, OH (US)

(*) Notice: Subject to any disclaimer, the term of this patent is extended or adjusted under 35 U.S.C. 154(b) by 0 days. days.

(21) Appl. No.: 15/448,749

(22) Filed: Mar. 3, 2017

Related U.S. Application Data

(60) Provisional application No. 62/304,374, filed on Mar. 7, 2016.

(51) Int. Cl.
A01K 15/02 (2006.01)
F21V 33/00 (2006.01)
F21V 23/04 (2006.01)
F21V 8/00 (2006.01)
H04R 1/02 (2006.01)
G01D 5/24 (2006.01)
A01K 29/00 (2006.01)
G08B 21/22 (2006.01)
F21W 111/00 (2006.01)
F21Y 113/10 (2016.01)

(52) U.S. Cl.
CPC ............ A01K 15/021 (2013.01); A01K 29/00 (2013.01); F21V 23/0485 (2013.01); F21V 33/0056 (2013.01); G01D 5/2405 (2013.01); G02B 6/0006 (2013.01); G08B 21/22 (2013.01); H04R 1/028 (2013.01); F21W 2111/00 (2013.01); F21Y 2113/10 (2016.08)

(58) Field of Classification Search
CPC .. A01K 15/021; A01K 29/00; F21V 23/0485; F21V 33/0056; G01D 5/2405; G02B 6/0006; G08B 21/22; H04R 1/028; F21Y 2113/10; F21W 2111/00
USPC ....................................................... 340/573.3
See application file for complete search history.

(56) References Cited

U.S. PATENT DOCUMENTS

| 6,273,027 B1* | 8/2001 | Watson .................. A01K 15/02 119/712 |
| 8,797,166 B2* | 8/2014 | Triener .................. G01G 17/08 119/421 |
| 8,839,744 B1* | 9/2014 | Bianchi ................ A01K 15/021 119/720 |
| 2007/0137584 A1* | 6/2007 | Travis ...................... A01K 5/02 119/51.02 |
| 2012/0160182 A1* | 6/2012 | So ........................ A01K 15/021 119/720 |
| 2015/0237834 A1* | 8/2015 | Schab .................. A01K 29/005 340/573.3 |
| 2016/0295832 A1* | 10/2016 | Trottier .................... A01K 5/02 |
| 2017/0202186 A1* | 7/2017 | Bonge, Jr. ............ A01K 27/009 |

* cited by examiner

Primary Examiner — Hirdepal Singh
(74) Attorney, Agent, or Firm — Ralph E. Jocke; Walker & Jocke

(57) ABSTRACT

An animal training and indicating device (10) includes a housing (12) having an outer surface (14). A capacitive sensor (54) is operative to detect contact by a paw or nose of an animal with the outer surface. Responsive to the contact, the device is operative to provide an illumination of at least one light emitter (60, 62), an audible output from a speaker (28) and at least one wireless RF signal which can be received by a portable wireless device (76).

25 Claims, 18 Drawing Sheets

ANIMAL TRAINING AND INDICATING DEVICE

TECHNICAL FIELD

Exemplary embodiments relate to devices and systems that are used in connection with training animals. Specifically, exemplary embodiments relate to systems in which contact by an animal with a device provides an indication of the animal's condition to a caretaker.

BACKGROUND

Animal training for domesticated animals can be conducted in various ways. One of the most commonly trained behaviors for domesticated animals is to enter or leave particular locations or areas in order to engage in different activities.

A common training activity is for a pet such as a dog, to be trained to leave the home or other enclosure where the pet is normally kept in order to perform a particular bodily function. Most commonly pets are trained to act in a certain way in order to be let outside so that the pet may urinate or defecate. Alternatively pets may be trained to act in a certain way when they need to be allowed to move to another area to perform a bodily function such as eating.

Even in cases where the animal has been properly trained, the caretaker for the animal may fail to note that the animal is giving the indication that it has been trained to give. For example, if a pet has been trained to go and sit by the door to indicate that it needs to go outside to urinate or defecate, this indication may not be noticed by the animal caretaker. This may be because the area by the door is not within sight of the animal caretaker. Alternatively, it may be dark and the animal's activity giving the indication may not be observed. Alternatively, the caretaker may be asleep or away from the animal and unable to observe that the animal is providing the indication.

Devices and systems by which an animal can be trained to provide an indication to a caretaker and devices for providing such an indication may benefit from improvements.

SUMMARY OF DISCLOSURE

Exemplary embodiments provide a device which an animal such as a house pet is trained to actuate by making contact therewith. The contact is made by the animal touching or bringing in close proximity the animal's paw or nose to a surface of the device. The exemplary device operates responsive to the contact to provide a visual illumination output and an audible output for periods subsequent to the contact. The illumination output and audible output are sufficient to provide an indication to a caretaker to allow the animal to exit the house, for example, in order to urinate or defecate.

Further exemplary embodiments include a wireless RF transmitter that can provide an indication of the contact to a portable wireless device. Further exemplary embodiments enable the animal to provide a further indication that the animal is ready to re-enter the house by making contact with a further device that may be positioned outside the house or other enclosure in which the animal is normally present.

Exemplary embodiments include a battery powered device that provides extended operation. Exemplary embodiments include generally sealed enclosures that prevent damage thereto due to the infiltration of dirt and moisture. Other exemplary embodiments include devices with a housing that can be readily cleaned and which are highly resistant to breakage.

Numerous additional features of exemplary embodiments are described in the following detailed description herein.

DETAILED DESCRIPTION

Figure 1:
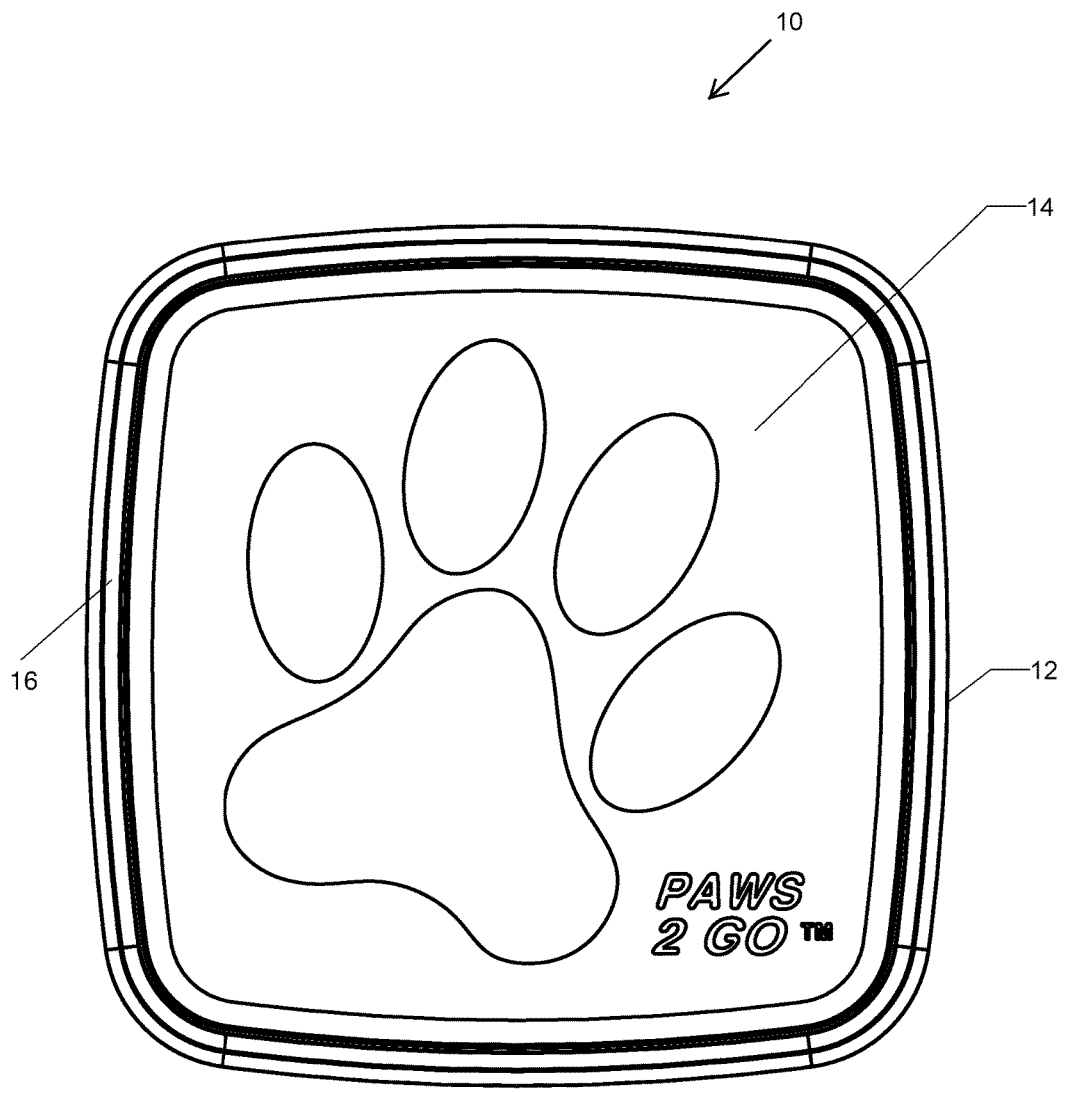
FIG. 1 is a top plan view a first embodiment of an exemplary embodiment of an animal training and indicating device.
Figure 2:
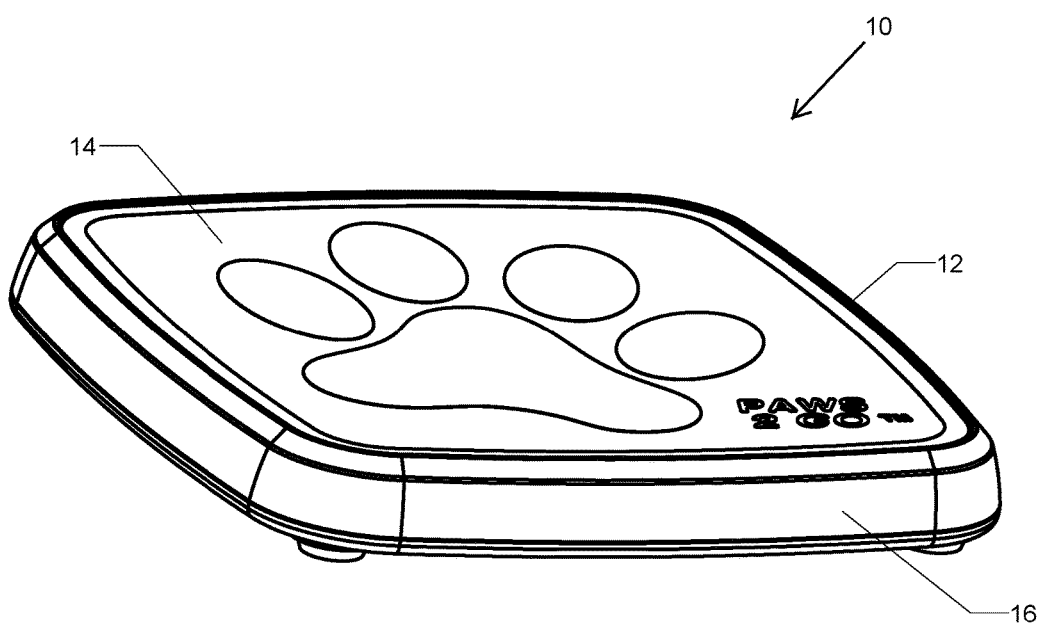
FIG. 2 is a front left perspective view of the device shown in FIG. 1.

Referring now to the drawings and particularly to FIGS. 1 and 2, there is shown therein a first exemplary animal training and indicating device 10. Device 10 includes a housing 12. The housing 12 includes an outer upper surface 14 and four side walls 16 that extend generally transverse to the upper surface. In the exemplary embodiment, the outer surface includes a label or other indicia which indicates an area of contact on the outer surface in which a contact by an animal is detected in the manner that is later discussed.

Figure 3:
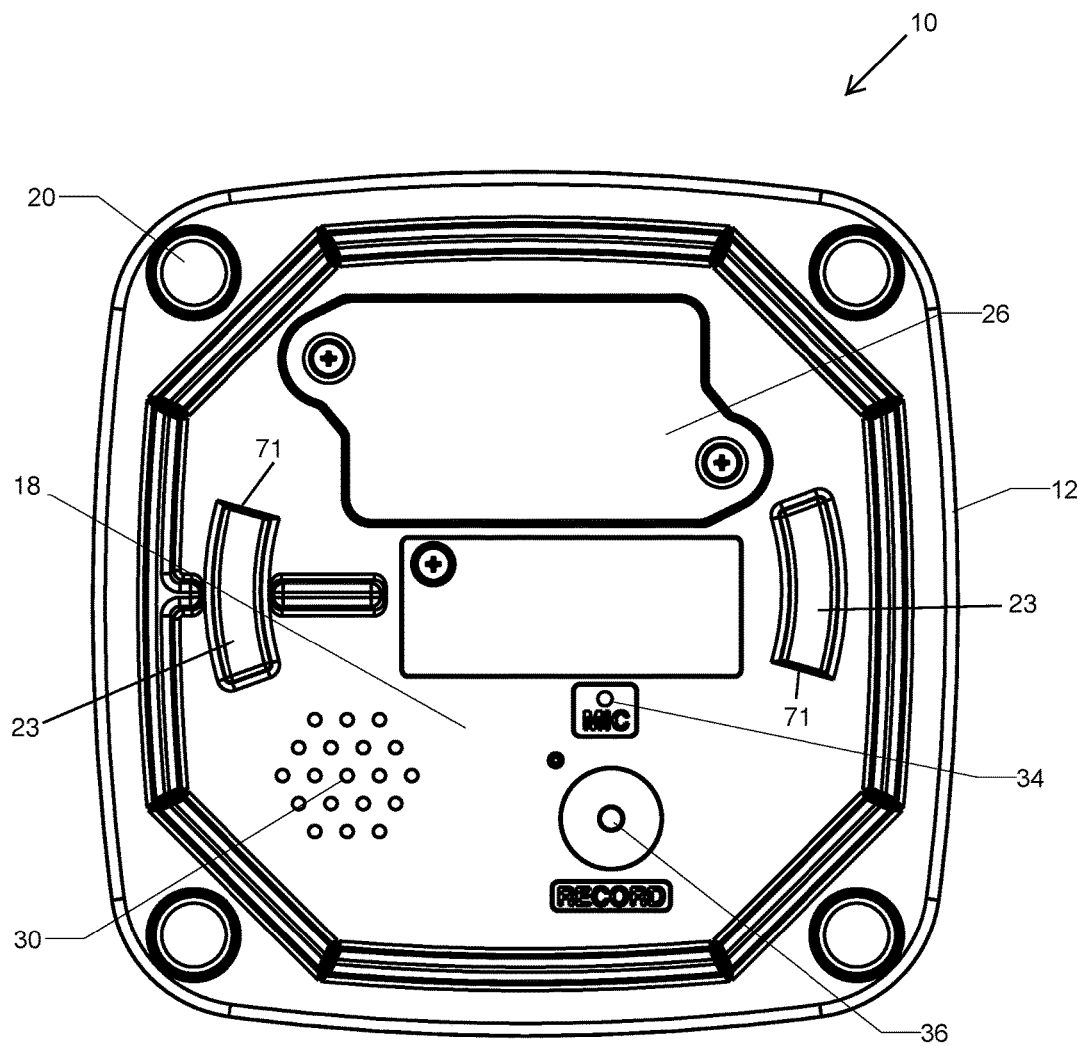
FIG. 3 is a bottom view of the device shown in FIG. 1.

As shown in FIG. 3, the exemplary housing 12 includes an inner, bottom surface 18. The inner surface 18 extends generally parallel of the outer surface. Four resilient feet 20 extend from the inner surface 18 and support the housing 12 on a floor, against a wall or other similar support surface. The inner surface also includes a pair of disposed arcuate recesses 23.

Figure 4:
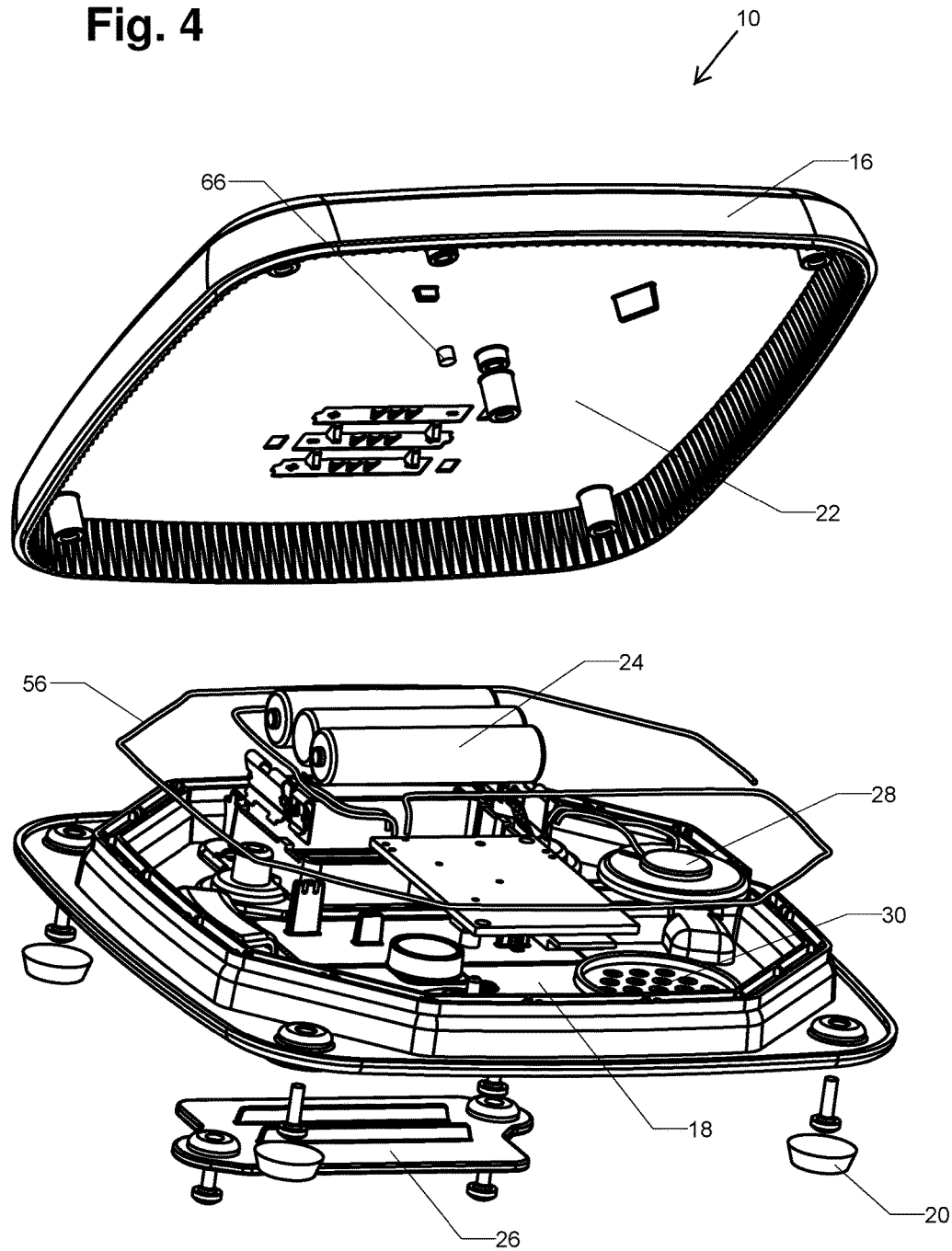
FIG. 4 is an exploded view of the device shown in FIG. 1.

In the exemplary embodiment, the housing bounds an interior area generally indicated 22. As represented in FIG. 4, the interior area houses circuits and other components of the device which are described hereinafter. For example in the exemplary embodiment, batteries 24 are positioned in a cavity within the interior area 22. In operation, the batteries are positioned within the interior area behind the removable cover 26.

In the exemplary embodiment, the interior area further includes a speaker 28. A plurality of speaker holes 30 in the inner surface 18 enable audible outputs from the speaker to be heard externally and away from the housing.

The exemplary embodiment further includes a microphone 32. The microphone is accessible to pick up audible sounds external of the housing through a microphone opening 34 in the inner surface. At least one input device 36 extends in the interior area and is enabled to receive inputs from caretakers and other users of the device. In the exemplary embodiment, the input device includes a manually actuatable switch. The manually actuatable switch enables the microphone to capture audible signals through the microphone and to store audio data in a data store of the device. This audio data in an exemplary embodiment is used to provide an audio output that is produced by the speaker of the device when a contact is made by an animal with the outer surface as later described in detail.

In the exemplary embodiment, the housing is configured so that there are no openings to the interior area other than through the inner surface. This configuration is useful to prevent the infiltration of dust, water and other contaminants into the interior area. Further in exemplary embodiments the housing is a generally sealed construction and is made durable to prevent damage thereto as a result of impacts or animal contacts. Further in exemplary embodiments, the housing is comprised of plastic or other material that is stain resistant and readily cleanable. Of course it should be understood that these features are exemplary and in other embodiments other or additional features may be used.

Figure 5:
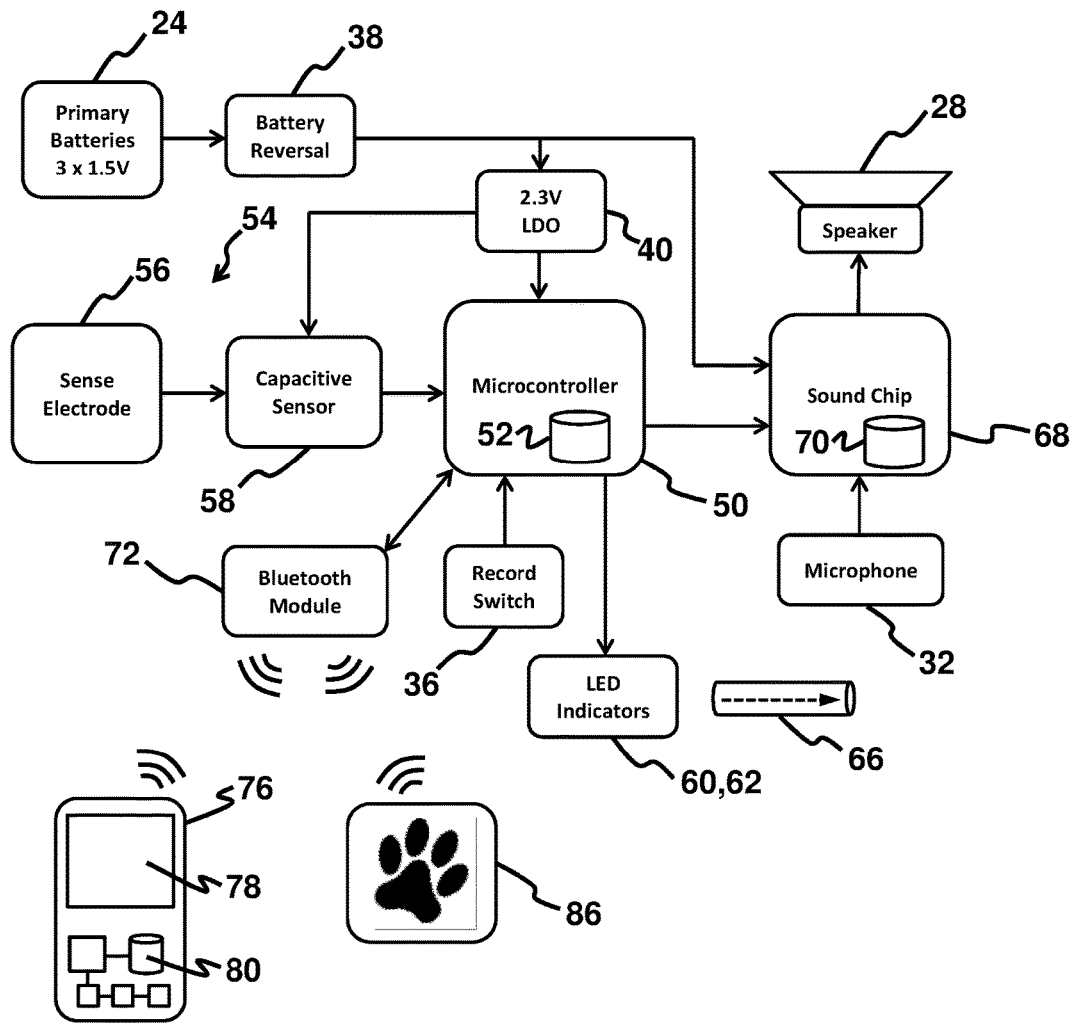
FIG. 5 is a schematic functional view of the exemplary device and system.

As represented in FIG. 5, the exemplary device includes in the interior area thereof, a plurality of circuits. These circuits are comprised of numerous different circuit components which carry out the functions that are described herein. It should be understood that these components are exemplary of numerous different circuit components, arrangements and operations that may be utilized to accomplish the functions, operations and results that are described herein.

Figure 6:
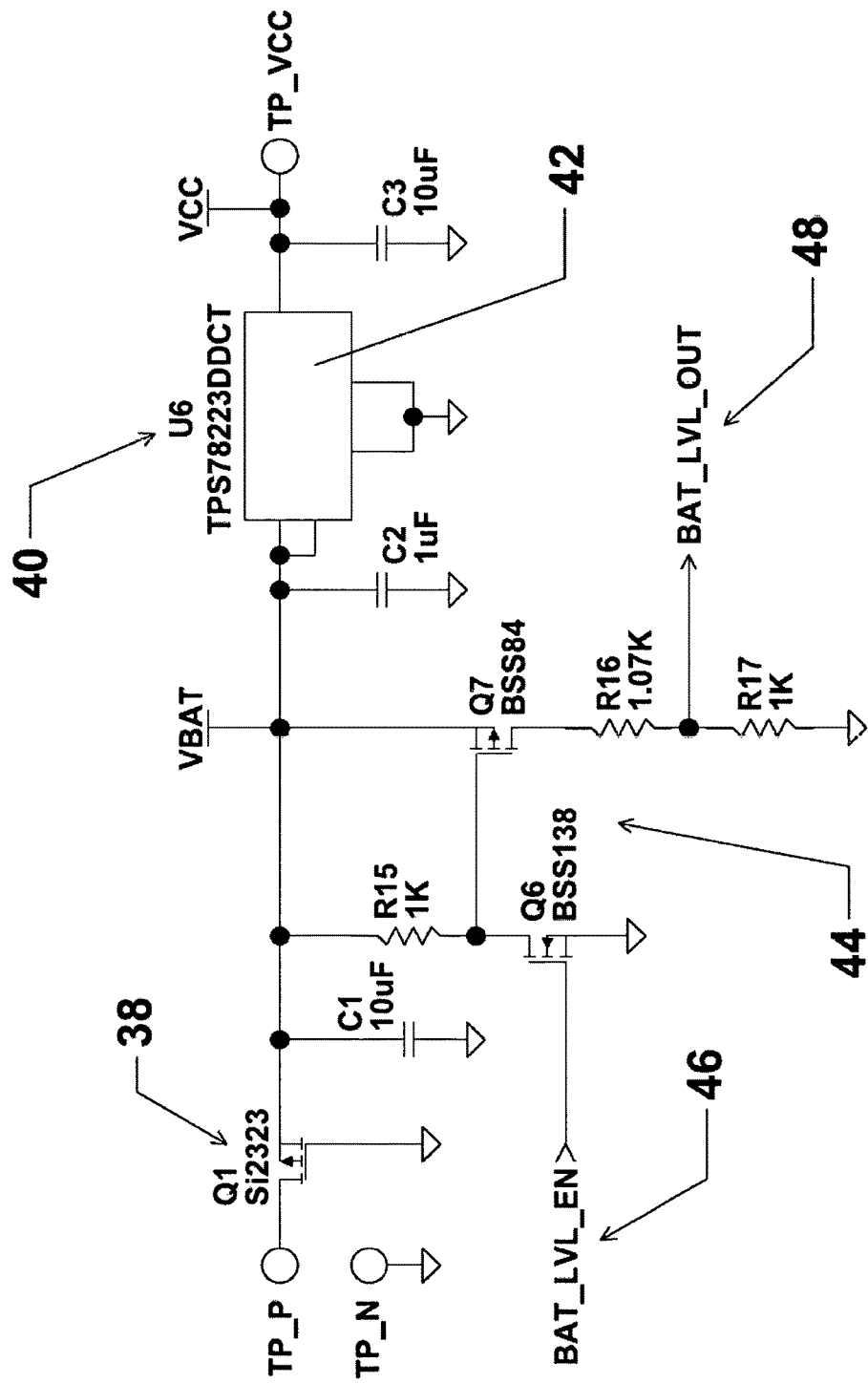
FIG. 6 is a schematic of an exemplary power management circuit.

In the exemplary embodiments, the batteries 24 are in operative connection with a battery reversal circuit schematically indicated 38. The exemplary embodiment of the battery reversal circuit as shown in FIG. 6 includes analog circuitry that protects the circuit components in the event that the batteries are installed backwards or otherwise incorrectly. As represented in the exemplary embodiment, an opposite applied voltage causes battery voltage not to be supplied to the other circuits in the device.

As represented in FIG. 5, the exemplary embodiment includes a power control circuit schematically indicated 40. As shown in FIG. 6, in the exemplary embodiment, the power control circuit includes a low drop out (LDO) regulator 42. The exemplary power control circuit and LDO regulator are operative to receive electrical power from the batteries at the rated output voltage of the batteries, and to provide an electrical power output to certain other device components at a reduced voltage which is lower than the rated output voltage of the battery. In an exemplary embodiment, the power control circuit including the LDO regulator is operative to receive the rated output voltage from the batteries at approximately 4.5 volts and to provide a reduced voltage to certain other circuits in the device at approximately 2.3 volts.

Further in an exemplary embodiment, the power control circuit 40 is operative to conserve electrical power from the batteries so that the device may operate for an extended period of time without the need for battery replacement. In the exemplary embodiment, the device is operative at all times while battery power is present. The exemplary device does not include a shutoff switch which might be inadvertently left off by an animal caretaker.

Further in the exemplary embodiment, the power control circuit 40 is operative to deliver electrical power at the reduced voltage until the battery output voltage begins to fall with time below the initial rated voltage. The drop in battery output voltage over time still causes the power control circuit 40 to output electrical power at a reduced voltage level. This condition continues until the battery output voltage falls below the reduced voltage level. In this condition, the exemplary power control circuit 40 operates to thereafter supply the other circuits in the device that were originally receiving the reduced voltage to thereafter receive power at the then current battery output voltage. This enables the device to operate on the battery power for as long as possible.

Further in an exemplary embodiment, a battery level circuit 44 is used to determine the present battery voltage level. In the exemplary arrangement, the battery level circuit is operative responsive to receiving an input on a line 46 to provide a switched analog output on a line 48 which is indicative of the then current battery level. In the exemplary embodiment, the battery level circuit is operated only on a periodic basis to obtain an indication of the then current battery level. The battery level indication may be then used to provide one or more outputs in a manner which is later discussed.

As represented in FIG. 5, the exemplary device further includes a microcontroller circuit 50. In the exemplary embodiment, the microcontroller circuit 50 includes a microprocessor including at least one data store which is schematically indicated 52.

In some exemplary arrangements, the processor utilized may include a processor suitable for carrying out computer executable instructions that are stored in the one or more associated data stores. The processor may include or be in connection with a non-volatile storage medium including instructions that include a basic input/output system ("BIOS"). For example, processors may correspond to one or more of a combination of a CPU, FPGA, ASIC or any other integrated circuit (IC) or other type of circuit that is capable of processing data and instructions. The data store may correspond to one or more of volatile or non-volatile memories such as random access memory, flash memory, magnetic memory, optical memory, solid state memory or other devices that are operative to store circuit executable instructions and data. Circuit executable instructions may include instructions in any of a plurality of programming languages and formats including, without limitation, routines, subroutines, programs, threads of execution, objects, methodologies and functions which carry out the actions such as those described herein. Structures for processors may include, correspond to and utilize the principles described in the textbook entitled *Microprocessor Architecture, Programming and Applications with the* 8085, by Ramesh S. Gaonker (Prentiss Hall 2002), which is incorporated herein by reference in its entirety. In the exemplary embodiment, the processor may comprise a microcontroller available from Texas Instruments. Of course it should be understood that these processors and data store descriptions are exemplary and numerous different types of processors, circuitry and data storage devices may be used.

Figure 7:
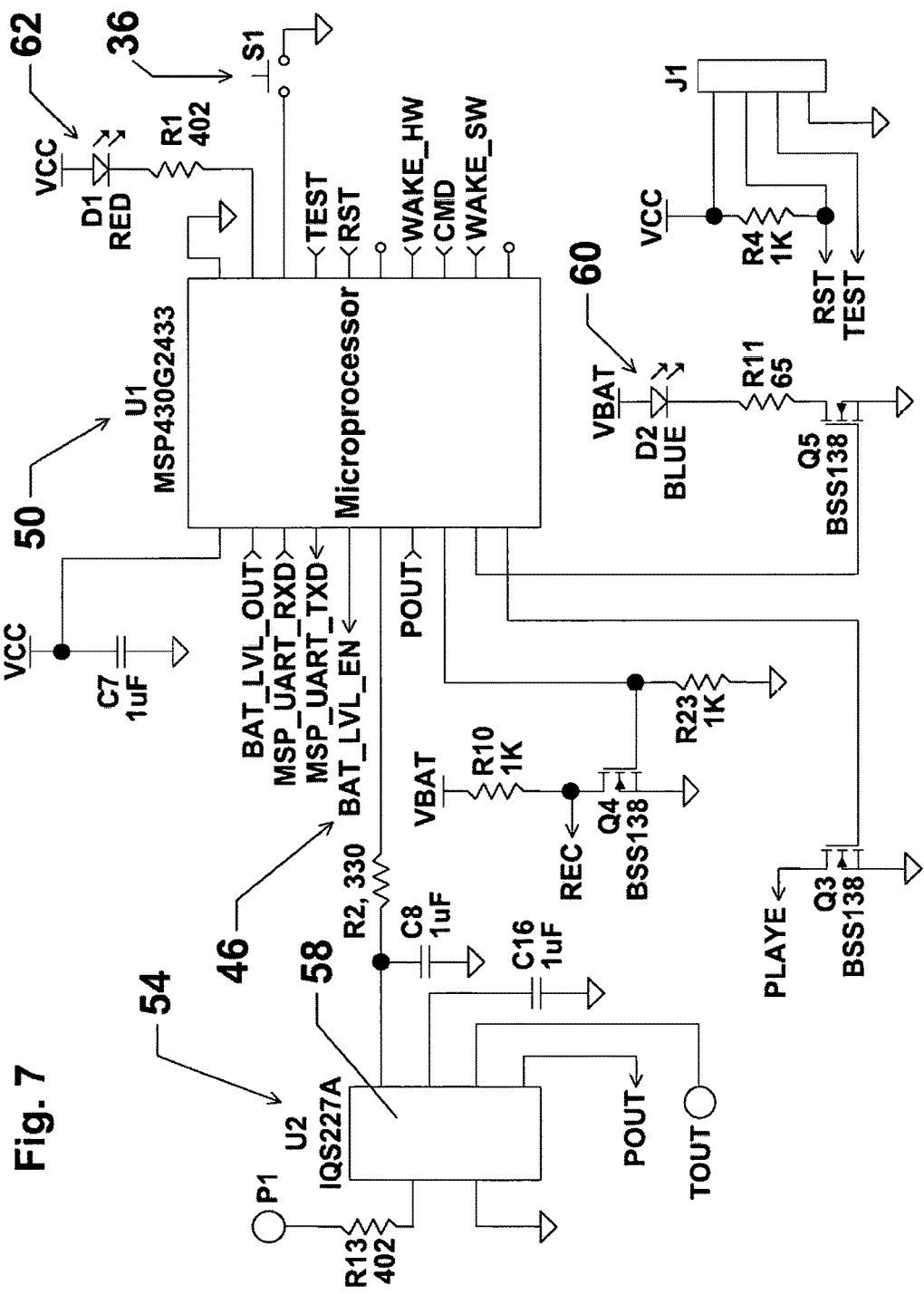
FIG. 7 is a schematic of an exemplary circuit including a microcontroller and touch sensor.

The exemplary microcontroller circuit 50 of an exemplary embodiment is shown in FIG. 7. The exemplary microcontroller circuit is operative to receive reduced voltage from the power control circuit 40 to carry out its programmed instructions.

In the exemplary device, the microcontroller circuit is in operative connection with a capacitive sensor schematically indicated 54. The exemplary capacitive sensor 54 includes at least one electrode 56. In the exemplary embodiment, the at least one electrode 56 may comprise a conductive trace or similar electrically conductive structure that extends adjacent to the upper surface of the housing. The electrode is in operative connection with a contact detect integrated circuit (IC) 58. In the exemplary embodiment the contact detect IC is operative to detect small changes in capacitance of the at least one electrode. If the change in capacitance detected by the contact detect IC 58 is above a certain level, at least one signal is given to the microcontroller circuit 50.

In the exemplary embodiment, the size and configuration of the at least one electrode is such that the contact detect IC will provide a signal indicative of a contact in response to an animal's paw or nose making a direct physical contact or by coming into close physical proximity with the outer surface of the housing. In exemplary embodiments, the electrode configuration is such that it is suitable for detecting a paw or nose of a dog physically touching or coming within 2 inches of the outer surface in the area of the at least one electrode. For purposes of this disclosure "contact" will be defined as including physical touching as well as a part of the animal coming sufficiently close to the surface adjacent the at least one electrode to be detected through operation of the device. However, in other embodiments where other types of animal contacts are to be detected, the electrode configuration and detection circuits may have other arrangements.

Further in the exemplary embodiment, the capacitive sensor is configured to operate at the reduced voltage provided by the power control circuit 40. This arrangement further enables the device to operate for extended periods without the need to replace the batteries. In exemplary embodiments, the microcontroller circuit 50 is in operative connection with one or more light emitters 60 and 62. In the exemplary embodiments, the light emitters include light emitting diodes (LEDs). As represented in FIG. 7, in the exemplary embodiment the light emitters operate at the rated output voltage provided by the battery. A signal output from the microcontroller circuit 50 is operative to cause a MOSFET or other transistor devices to enable the rated battery voltage to act on the LEDs causing them to illuminate. This enables the exemplary embodiment to drive the light emitters using the rated battery voltage while other circuits operate at the reduced voltage. Further in exemplary embodiments the LED indicators may be operated in response to different signals. For example, LEDs may be illuminated continuously or intermittently responsive to a detected contact of the sense electrode by an animal. The microcontroller circuit may deliver signals that are operative to cause the LEDs to illuminate continuously or intermittently for an illumination time period depending on the programmed instructions of the microcontroller circuit. Alternatively or in addition, the exemplary microcontroller circuit may operate one or more of the LED indicators to provide an indication of other conditions such as for example, a low battery. Of course these approaches are exemplary of approaches that may be used.

Further in exemplary embodiments the LEDs may be in operative connection with one or more light pipes schematically indicated 66 in FIG. 4. In the exemplary embodiment, light pipes are used to conduct light from the at least one light emitter to at least one external surface of the housing. This enables light emitters to be within the interior area and have the illumination thereof perceivable externally of the housing. In exemplary embodiments, the light pipes may be integrally formed with the plastic housing and may include lenses or diffusers to make the illumination of the light emitters more readily perceivable. Of course these approaches are exemplary and in other embodiments, other approaches may be used.

In the exemplary embodiment, the device further includes an audio circuit 68. The exemplary audio circuit includes an IC comprised of a sound chip which enables digital recording and playback. The audio circuit 68 includes a data store 70 as schematically represented therein. As represented in FIG. 5, the audio circuit 68 is in operative connection with the microphone 32 and the speaker 28.

Figure 8:
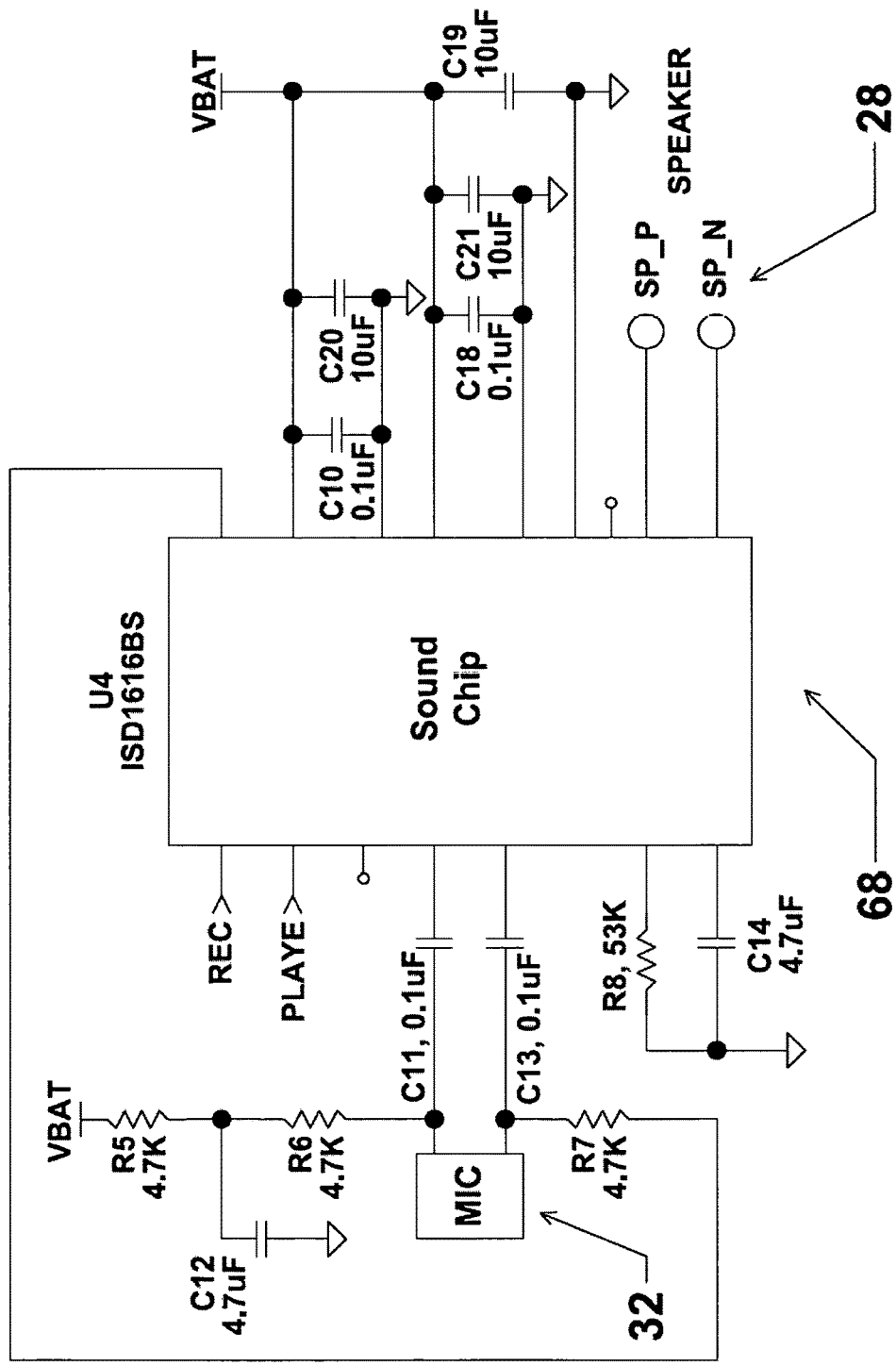
FIG. 8 is a schematic of an exemplary circuit including a sound chip.

As shown in detail in FIG. 8, the exemplary audio circuit 68 is in operative connection with the rated voltage from the battery in order to enable the audio circuit to provide an audio output from the speaker 28 as well as to capture audible signals through the microphone 32.

In the exemplary embodiment, the sound chip of the audio circuit 68 is operative responsive to a manual input through the input device 36 and outputs generated responsive to operation of the microcontroller circuit 50 to cause the sound chip to capture audible signals through the microphone and to store in the data store of the sound chip, audio data which corresponds to the audible signals. Thereafter, responsive to the capacitive sensor and the microcontroller circuit detecting a contact by an animal with the outer surface of the housing, the microcontroller is operative to send at least one signal to the audio circuit 68. The signal is operative to cause the audio circuit to output an audio output corresponding to the audio data for a sounding time period. The audio output for the sounding time period is intended to be sufficient to enable the device to provide an audible indication to an animal caretaker of the animal contact. Of course this approach is exemplary and in other embodiments, other approaches may be used.

Figure 9:
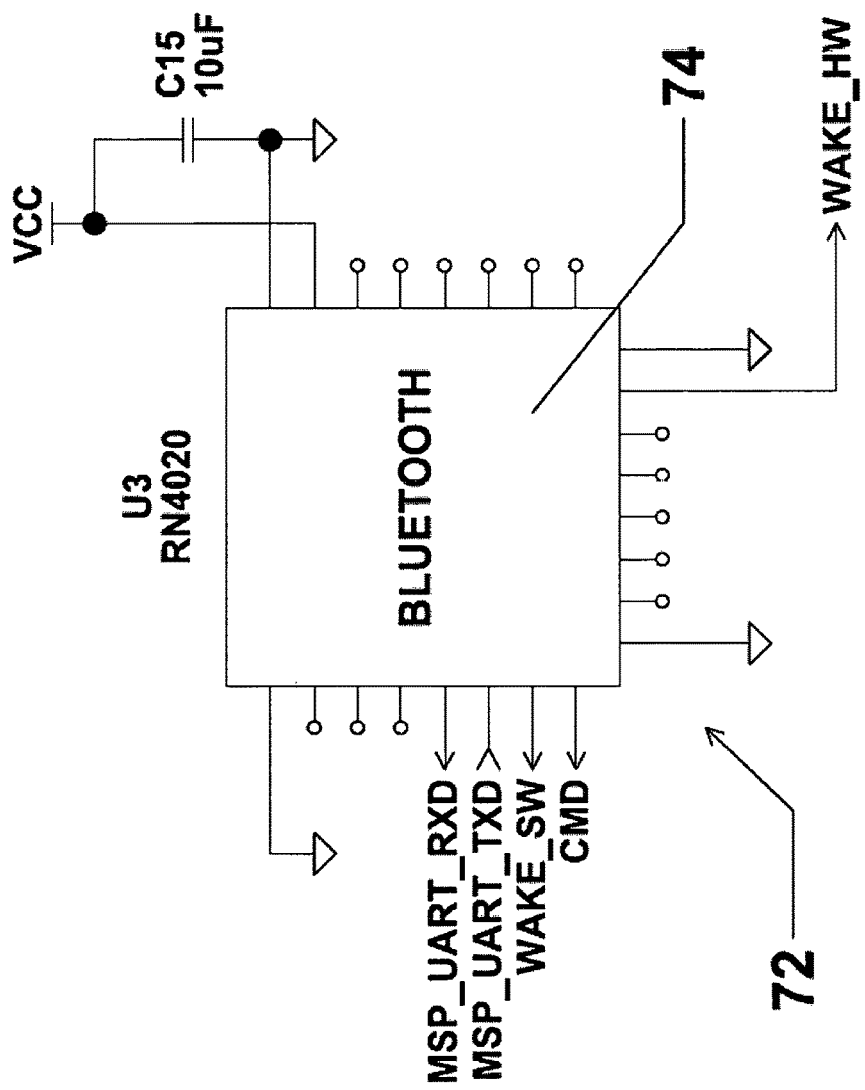
FIG. 9 is a schematic of an exemplary circuit including a wireless RF transmission device.

The exemplary device further includes at least one transceiver circuit schematically indicated 72. In the exemplary embodiment the transceiver circuit comprises a Bluetooth IC module 74 as shown in detail in FIG. 9. In the exemplary embodiment, the Bluetooth module 74 is operative to output RF signals.

In exemplary embodiments, the transceiver circuit 72 operates as an RF wireless transmitter that communicates RF signals with a portable wireless device 76. In the exemplary embodiment, the Bluetooth module communicates with the microcontroller circuit through a UART serial interface. In the exemplary arrangement, signals from the microcontroller circuit 50 are operative to wake the Bluetooth module 74 from a lower power state to a high power state in which the transceiver circuit operates at the rated voltage of the battery. The microcontroller circuit is operative to wake the Bluetooth module responsive to the microcontroller circuit 50 detecting a contact by an animal with the outer surface. In the exemplary arrangement, the Bluetooth module 74 is operative to send at least one wireless signal to the portable wireless device indicative of the contact. As discussed hereafter, the portable wireless device 76 of the exemplary embodiment includes a portable output device 78 such as a screen, and a portable transceiver circuitry 80 that includes a portable RF receiver. The portable wireless device may operate to provide the user thereof with an indication of the contact by the animal with the device.

In one exemplary embodiment, the device is operative to enable a user to initialize the device by providing manual input through the input device 36 on the inner surface of the housing. The manual input is operative to cause the microcontroller circuit 50 to send at least one signal to the audio circuit 68. The audio circuit is then operative to capture audible signals through the microphone 32. These audible signals may be, for example, the user's voice providing the animal with instructions or words of assurance that the caretaker will soon arrive to let the animal out. Alternatively or in addition the audible signals that are captured may be other signals intended to alert the caretaker who may be some distance away from the device, that the contact by the animal has been made. Alternatively in other arrangements, inputs through at least one input device may include musical sounds or other sounds that the owner of the device wishes to have output in response to animal contact therewith.

The audio circuit 68 is operative to capture the audible signals through the microphone and store the corresponding audio data in the data store of the sound chip. Once the audio data has been stored, the exemplary embodiment operates in a wait mode until the capacitive sensor 54 senses a change in capacitance that corresponds to a contact by the animal. As previously stated, in exemplary embodiments this contact may correspond to contact by the animal nose or paw with the outer surface of the housing.

The contact detect IC 58 of the capacitive sensor is operative to send at least one signal to the microcontroller circuit 50 responsive to the animal contact. The microcontroller circuit is operative responsive at least in part to the signal to cause at least one signal to be sent to the sound chip of the audio circuit 68. The signal from the microcontroller is operative to cause the sound chip to provide the audio output through the speaker for a sounding time period after the contact is made. The sounding time period of the output continues for a programmed time considered to be sufficient to provide notification to the caretaker and/or comfort to the animal that the animal's needs will soon be met.

Further in the exemplary embodiment the microcontroller circuit 50 is operative responsive to the detected contact to cause the one or more light emitters to illuminate. The light emitters illuminate for an illumination time period responsive to instructions included in the microcontroller circuit. In the exemplary arrangement, the illumination time period is considered sufficient to provide an indication to the caretaker of the animal's needs.

Further in the exemplary embodiment the microcontroller circuit 50 is operative responsive to the detected contact to cause the transceiver circuit 72 to operate to send at least one wireless RF signal. The at least one wireless RF signal is enabled to be received by the portable wireless device 76 of the caretaker. The at least one wireless device is then operative to provide at least one output through the portable output device thereof to further alert the animal caretaker to provide an indication of the animal's condition.

Figure 16:
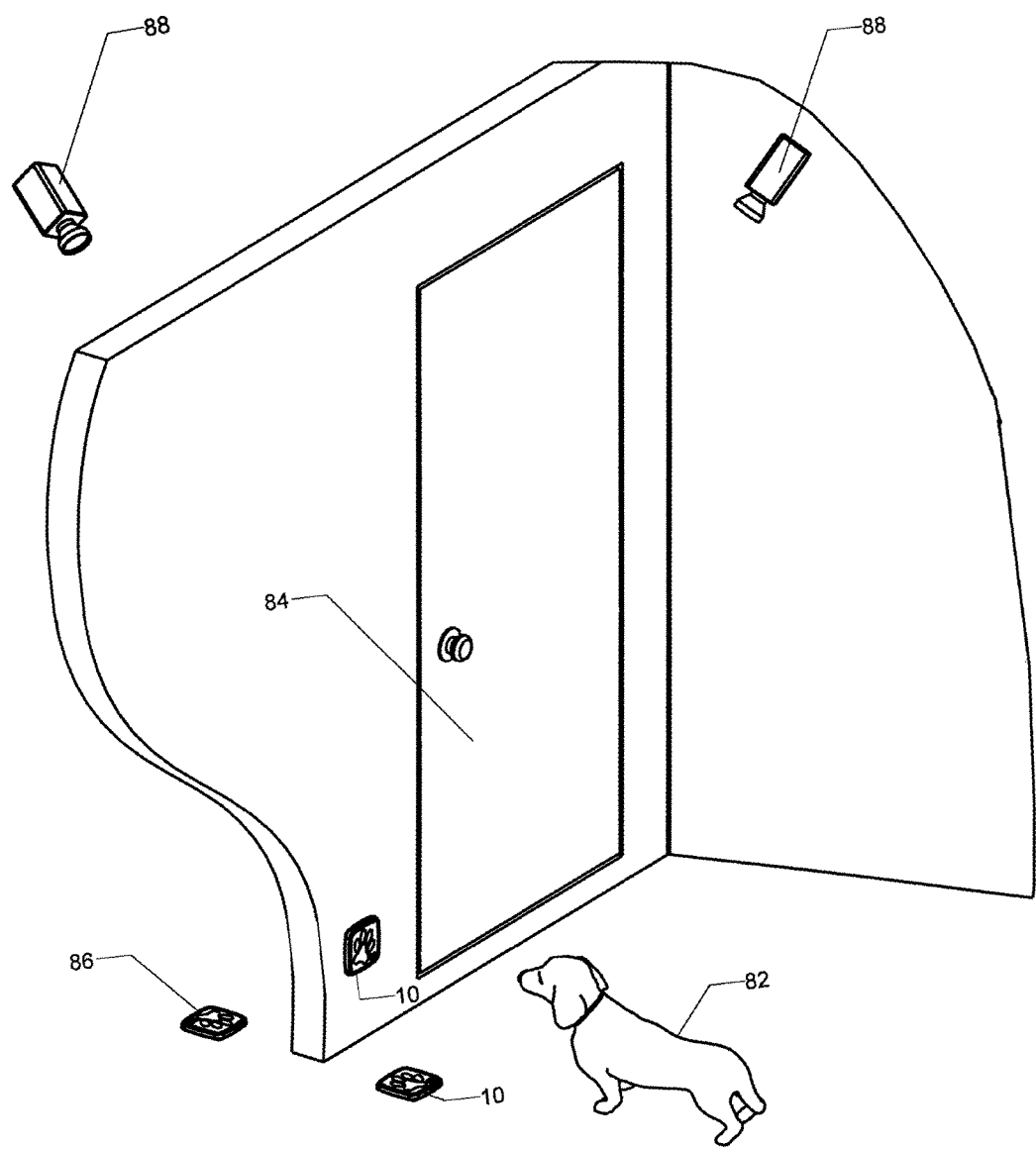
FIG. 16 is a schematic view of an enclosure including an animal that has been trained to operate the exemplary indicating device.

In an exemplary application for the device, the device 10 may be positioned within an enclosed structure such as a house or other structure where an animal 82 is normally housed. As represented in FIG. 16, the device 10 may be positioned adjacent to a door 84 or other access portal that can be used for ingress and egress by the animal to and from the interior of the enclosure. The device may be supported on a floor, mounted to a wall or supported via other suitable structures.

Figure 15:
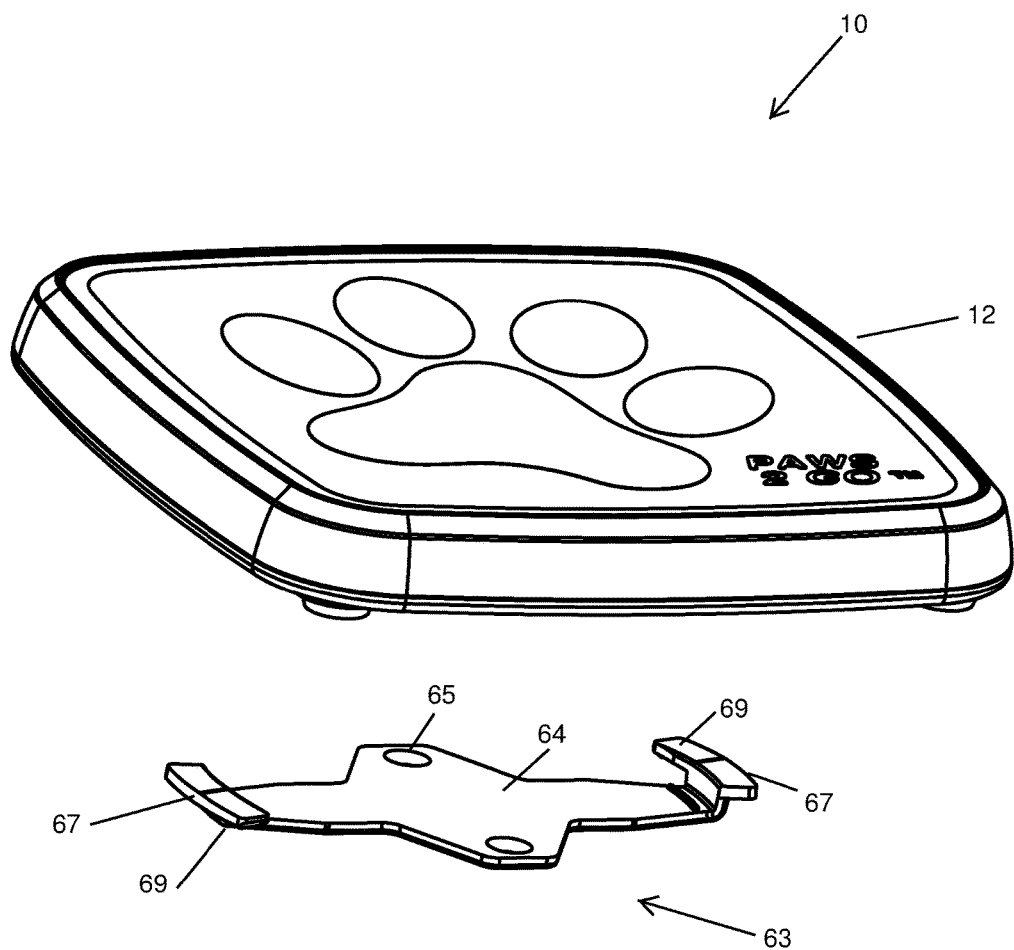
FIG. 15 is a perspective view of the device of FIG. 1 and an exemplary mounting bracket.

In the exemplary embodiment the device 10 may be secured to a floor, wall or other surface or structure through a mounting bracket 63 shown in FIG. 15. In the exemplary embodiment bracket 63 is a unitary structure comprised of metal or other suitable material. Bracket 63 includes a base portion 64 that is generally planar and which includes openings 65 therethrough. The base portion may be placed in abutting relation with a surface of a wall or floor and the bracket held thereto by fasteners that extend through the openings 65.

Exemplary bracket 63 further includes a pair of disposed projections 67 that extend transversely from the base portion. In the exemplary embodiments the projections, which may be alternatively be referred to as tabs, include arcuate projections that are configured to releasibly engage in the mounting recesses 23 of the inner surface 18 of the housing 12. In an exemplary arrangement the projections include tapered portions 69 that are somewhat thinner with proximity to the respective distal ends.

In the exemplary embodiment the mounting recesses have transverse slot openings 71 as shown in FIG. 3, at the ends thereof. The slot openings are sized to accept the tapered portions 69 therein. In exemplary embodiments the bracket 63 may be releasibly engaged with the housing 12 by extending the projections 67 into interengaging relation with the mounting recesses 23. The housing and mounting bracket may be further secured in engagement by the relative rotational movement of the mounting bracket 63 and the housing 12 such that the tapered portions extend in the slot openings 71. Such engagement in the exemplary embodiment is operative to secure the device to a vertical or horizontal surface. The exemplary bracket arrangement assures that the speaker holes are disposed away from the adjacent surface so that the output audible sounds from the device can be readily heard in the area of the device. Further the exemplary device may be readily disengaged from the bracket by relative rotation of the bracket and device so that the tapered portions 69 no longer extend in the slot openings 71. The housing may then be moved transversely away from the bracket so that the projections 67 no longer extend in the mounting recesses.

Of course it should be understood that this mounting arrangement is exemplary and in other embodiments other approaches may be used. For example, various configurations of interengaging projections and recesses may be utilized in various mounting structures. These may include for example the reverse configuration of the exemplary embodiment, such as projections that are in operatively fixed connection with the device housing that engage recesses in operatively fixed connection with brackets or other structures. Numerous different mounting devices, structures and approaches may be utilized for securing exemplary devices.

In some exemplary arrangements, the animal is trained to contact the outer surface of the device by bringing its paw or nose into touching contact or otherwise close proximity to the outer surface to indicate that the animal needs to leave the enclosure in order to perform a bodily function such as to defecate or urinate. Training of the animal is facilitated by the audio outputs that are provided by the speaker of the device when contact by the animal with the device is made. Further in exemplary embodiments the device will operate to provide an illumination output, an audible output and an RF wireless output responsive to each contact by the animal with the device which occurs after the then current illumination period and sounding period have been completed. Thus if the caretaker is not alerted in response to the initial animal contact, the animal is enabled to provide further indications so as to attempt to alert the caretaker. Of course upon receiving the indication from the animal, the caretaker is enabled to open the door 84 so as to allow the animal to leave the enclosure and perform its bodily function outdoors. Of course it should be understood that these approaches are exemplary and in other embodiments, other or additional features may be used.

For example, in other exemplary embodiments one or more input devices on the device may be actuated by a user to cause the at least one circuit to change the output properties of the illumination devices. For example in some exemplary embodiments, the illumination devices may be multicolor illumination devices. One or more inputs provided through input devices such as tactile buttons, switches or audio instructions received by an input device may be operative to change the color output upon illumination of one or more light emitters of the device. Further, inputs through one or more input devices may be operative to change the illumination properties of the light emitters. For example, inputs may be operative to cause the light emitters to flash at different frequencies, to flash in different color sequences or in other arrangements corresponding to inputs. Further in exemplary embodiments, inputs to at least one input device may be operative to accept or change the illumination time period. For example depending on the circumstances, the caretaker or other operator of the device may want the illumination period to extend for a shorter or longer period. This period may be changeable through one or more inputs through buttons or other suitable input devices of the device. Further in alternative embodiments the at least one input device may be operative to receive inputs which are operative to change the character or duration of the illumination time period. This may be done, for example, such that the illumination outputs change with repeated contact by the animal with the device. Thus for example if the animal is becoming more desperate, the illumination outputs may change in intensity, color or other properties so as to indicate greater urgency in the indication given by the animal. Of course these approaches are exemplary and in other embodiments, other approaches may be used.

In still other embodiments one or more input devices may be used to provide inputs that are operative to change the sounding time period or other properties of the audio output that are given by the device. This may include, for example, providing inputs which set the duration of the sounding time period and/or the number of repetitions that the stored audio data is utilized to provide outputs through the speaker. In other arrangements the at least one input device may be operative to change the volume level of the audio outputs. Alternatively or in addition, the at least one input device may be utilized to change the character of the sounding time period and/or audio outputs responsive to repeated contacts which may correspond to increased urgency of the indication being given by the animal. Further, exemplary embodiments may include audio data corresponding to stored signals such as a siren sound or other sound that can be programmed to be given under certain circumstances. Such preprogrammed sounds may be selectable and the volume and duration thereof modified through at least one input through the input device.

Further in exemplary embodiments that include a transceiver circuit, the interface of the at least one portable device may be utilized as an input device so as to set instructions related to illumination outputs, audible outputs and other outputs from the device. A suitable application interface may be provided in some embodiments so as to enable the caretaker to set numerous parameters as well as to receive different parameters from the exemplary devices.

Further in some exemplary embodiments, the at least one circuit may include a clock circuit. For example in some exemplary embodiments, the clock circuit may be integral with the microcontroller circuit 50. The clock circuit may operate in conjunction with the contact detection circuitry to store in at least one data store, data corresponding to each contact time that a contact is made by an animal. The at least one circuit may be operative to store in the data store, event data which corresponds to each of the contacts and the contact time that the animal has made contact with the device.

In exemplary embodiments, the at least one transceiver circuit may operate as an RF wireless transmitter to produce wireless RF signals indicative of the event data. Such event data may be useful to a caretaker in determining timing and frequency of the animal contacting the device. Such information may be useful in connection with detecting animal problems or other conditions that may exist with the animal. Of course these approaches are exemplary and in other embodiments, other approaches may be used.

In further exemplary embodiments, device 10 may be operable in connection with a further device 86. The further device 86 may be positioned outside of the enclosure in which the animal is normally housed as represented in FIG. 16.

In the exemplary embodiment, the further device 86 includes one or more circuits similar to the device 10. Responsive to contact by the animal with the outer surface or other portion of the further device, or other indication given by the animal through the further device, the further device is operative to provide at least one further RF wireless signal. This at least one further RF wireless signal can be indicative that the animal has completed its bodily function outside the enclosure and wishes to return to the interior thereof. In some embodiments the further device 86 may be actuated by the animal making a contact therewith which is detected by a capacitance sensor, while in other embodiments the further device may be actuated by other types of sensors, such as the animal pushing or pulling on an actuator, the animal standing on a weight sensing surface or other suitable detection device.

In the exemplary embodiment, the transceiver circuit 72 of the device is operative to cause at least one signal to the at least one circuit included in the device. The at least one circuit operates in response to its stored instructions to cause one or more illumination outputs, audio outputs and/or RF outputs indicative of the further contact. Thus for example in the exemplary arrangement, the device can provide illumination outputs, audible outputs and transmit RF output signals indicative that the animal now wishes to return to the enclosure. In some exemplary arrangements the programming of the at least one circuit in the device may be operative to cause the outputs from the device responsive to the further RF signal, be different from those provided in response to contact by the animal with the outer surface of the device. Thus the outputs from the exemplary device enable the caretaker to distinguish that the signals are being presented in response to contact with the further device 86. This enables the caretaker to be reminded to let the animal back in after the animal has performed a bodily function. Further the different outputs enable the caretaker to be aware when the animal is within the house or other enclosure, that another animal or object may have contacted the further device 86 and there is no need to allow the animal to exit from the enclosure. Of course these approaches are exemplary and in other embodiments, other approaches may be used.

In some exemplary arrangements, the device 10 may be in operative connection with a wireless router or similar device associated with the house or particular enclosure in which the animal is normally housed. Such a wireless router may be in operative connection with a personal computer or other computing device that is operative to send text messages or other messages indicative of the contact to a portable wireless device over a wide area network such as wireless broadband, the Internet or other suitable networks. Further other parameters that are detectable through operation of the device may be similarly transmitted in such manner. Further in exemplary arrangements, other detection devices such as cameras 88 may be in operative connection with the router so as to transmit images of the device and the animal to a remote computer such as a portable device.

In some exemplary arrangements, a homeowner may have installed an automatic "doggie door" or other portal which enables the animal to leave and enter the home. Through remote wireless communication and control devices located within the home, the homeowner may be able to selectively open and close the doggie door so that the animal can leave after the message corresponding to contact with the device has been received. Further, the images from the cameras 88 enable the homeowner to see that the animal has left the enclosure and can close the door thereafter. Likewise in an exemplary arrangement, the remote homeowner may detect the further contact with the further device 86. The arrangement may include a camera 88 in a position to observe the further device. The remote user may thereafter enable opening of the doggie door or other portal so as to allow the animal to reenter the house.

Of course these approaches are exemplary and in other embodiments, other approaches may be used.

FIGS. 10-14 show examples of outputs from a portable wireless device that may be produced responsive to wireless signals communicated with exemplary embodiments. As can be appreciated, exemplary embodiments of portable wireless devices include circuitry that is operative to execute stored instructions that are programmed in the device. This enables providing a wide variety of capabilities for such portable wireless devices that operate in conjunction with devices of exemplary embodiments.

Figure 10:
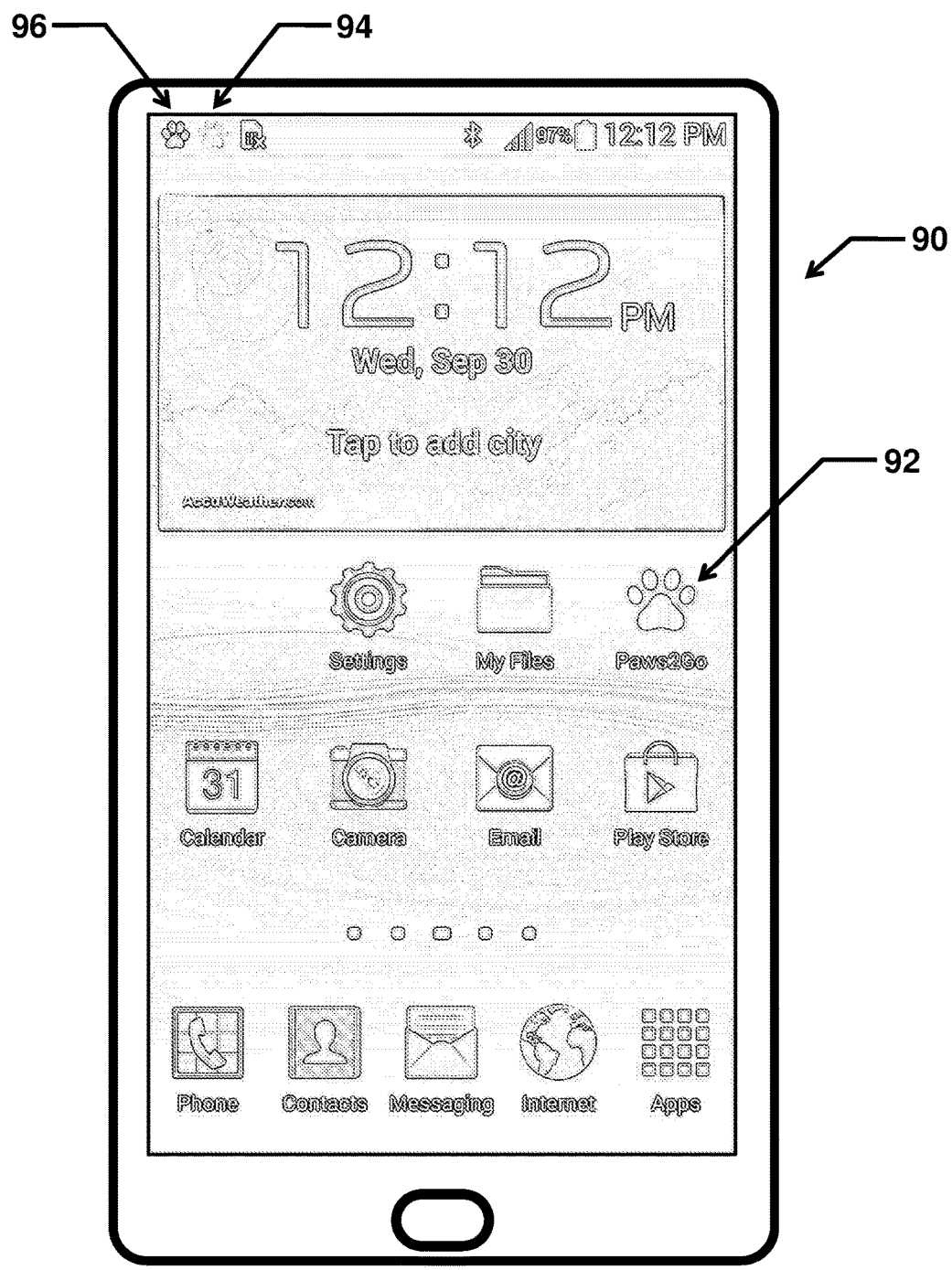
FIG. 10 is an exemplary output through a portable wireless device that communicates with the exemplary indicating device.

For example FIG. 10 shows an output 90 from a portable output device on a portable wireless device. The exemplary output 90 includes an application icon 92 which shows that the instructions associated with the device are installed and available to be operated on the portable wireless device. The exemplary output further includes a notification icon 94 which indicates that the service is active on the portable wireless device. Further in the exemplary output 90, an alert icon 96 is presented. The alert icon is operative to indicate that the portable wireless device has received the at least one wireless RF signal indicative of contact by the animal with the outer surface of the device 10.

Figure 11:
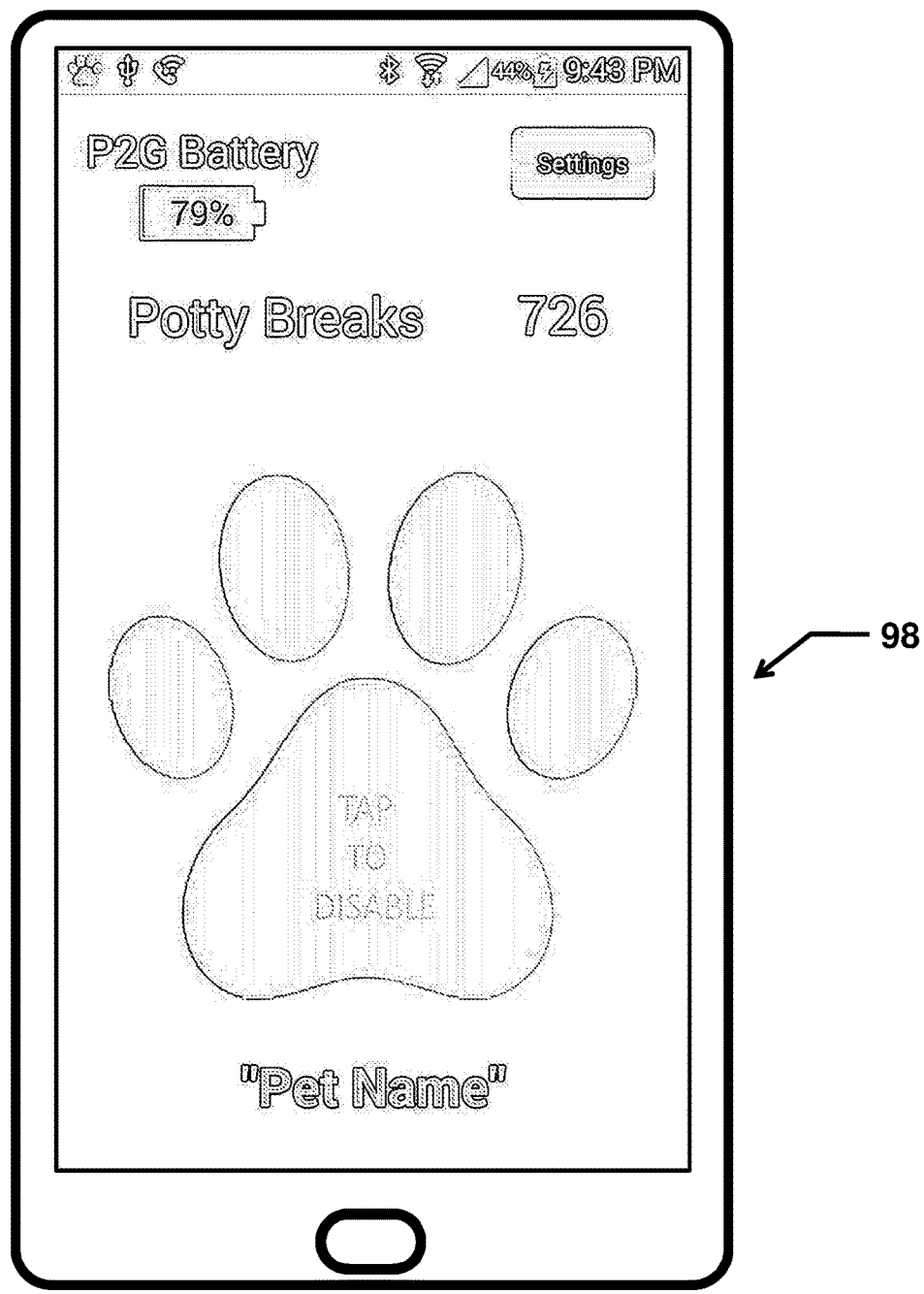
FIG. 11 is an exemplary output from a portable wireless device that communicates with the exemplary input device.

FIG. 11 shows a further exemplary output 98 from a portable wireless device. The exemplary output 98 is indicative of a main output with the functionality for monitoring the device 10 enabled. As represented in output 98, a large paw icon is shown. The paw icon can be contacted on the touch screen display which serves as an input device of the portable wireless device in order to enable and disable communication between the portable wireless device and the device 10. Further outputs in exemplary output 98 provide an indication of the current battery level of the batteries 24 in the device 10. This is output through the portable output device responsive to wireless signals communicated by the wireless RF transceiver or other devices in operative connection with the device 10.

Further in the exemplary output 98, there is a numerical indication which corresponds to the event data. In the exemplary output, a total number of contact events is indicated. However, it should be appreciated that in other embodiments detailed time and contact event data may be output through the portable wireless device. Of course these approaches are exemplary and in other embodiments, other approaches may be used. Further as represented in output 98, a user is enabled to provide inputs through at least one input device on the portable wireless device to identify the name or other designator for the animal who provides an indication through the device. For example if the animal is a dog whose name is "Max," the user is enabled to indicate that this device output is associated with Max. Of course these approaches are exemplary and in other embodiments, other approaches may be used.

Figure 12:
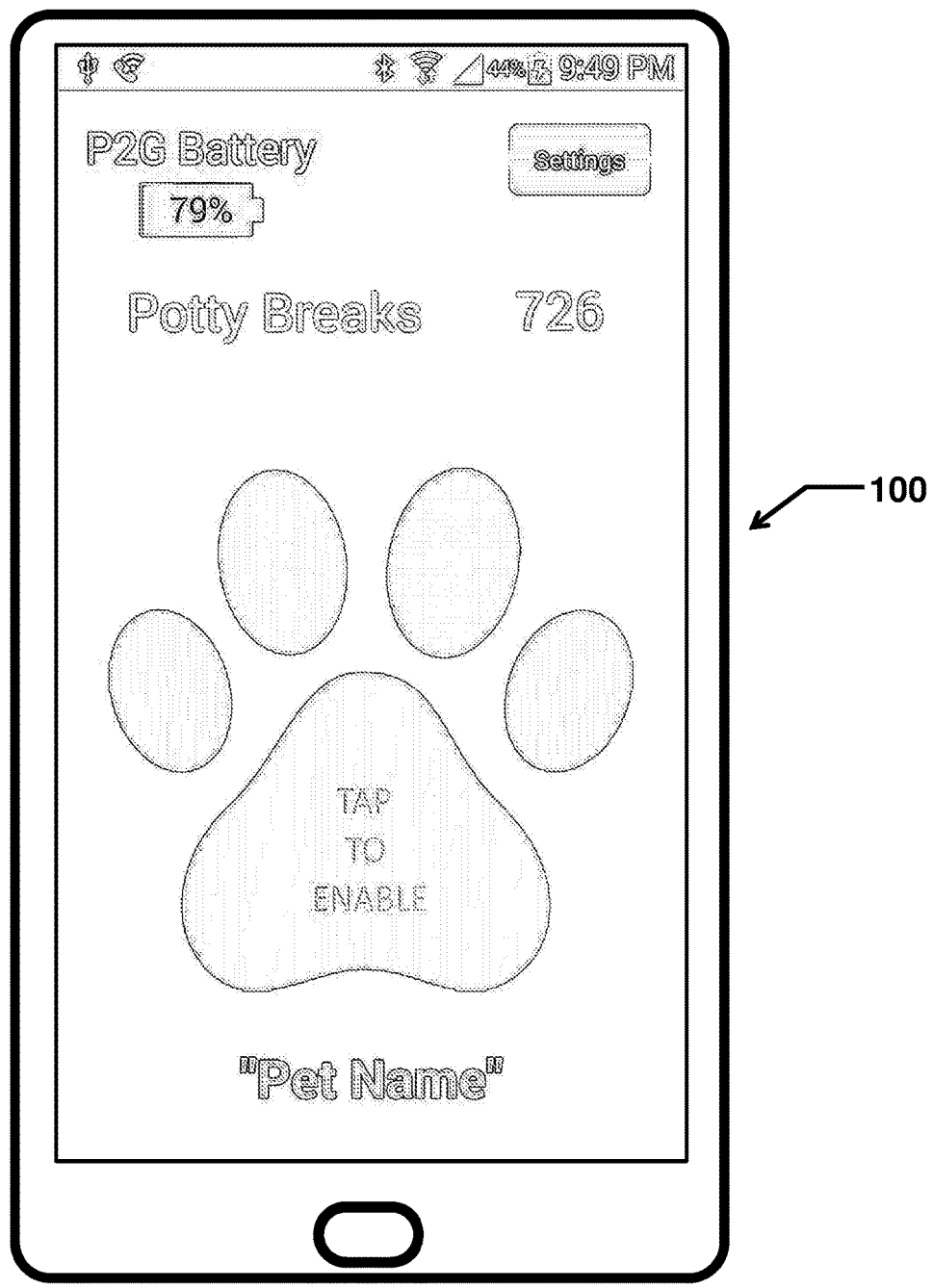
FIG. 12 is a further exemplary output from a portable wireless device that communicates with the exemplary indicating device.
Figure 13:
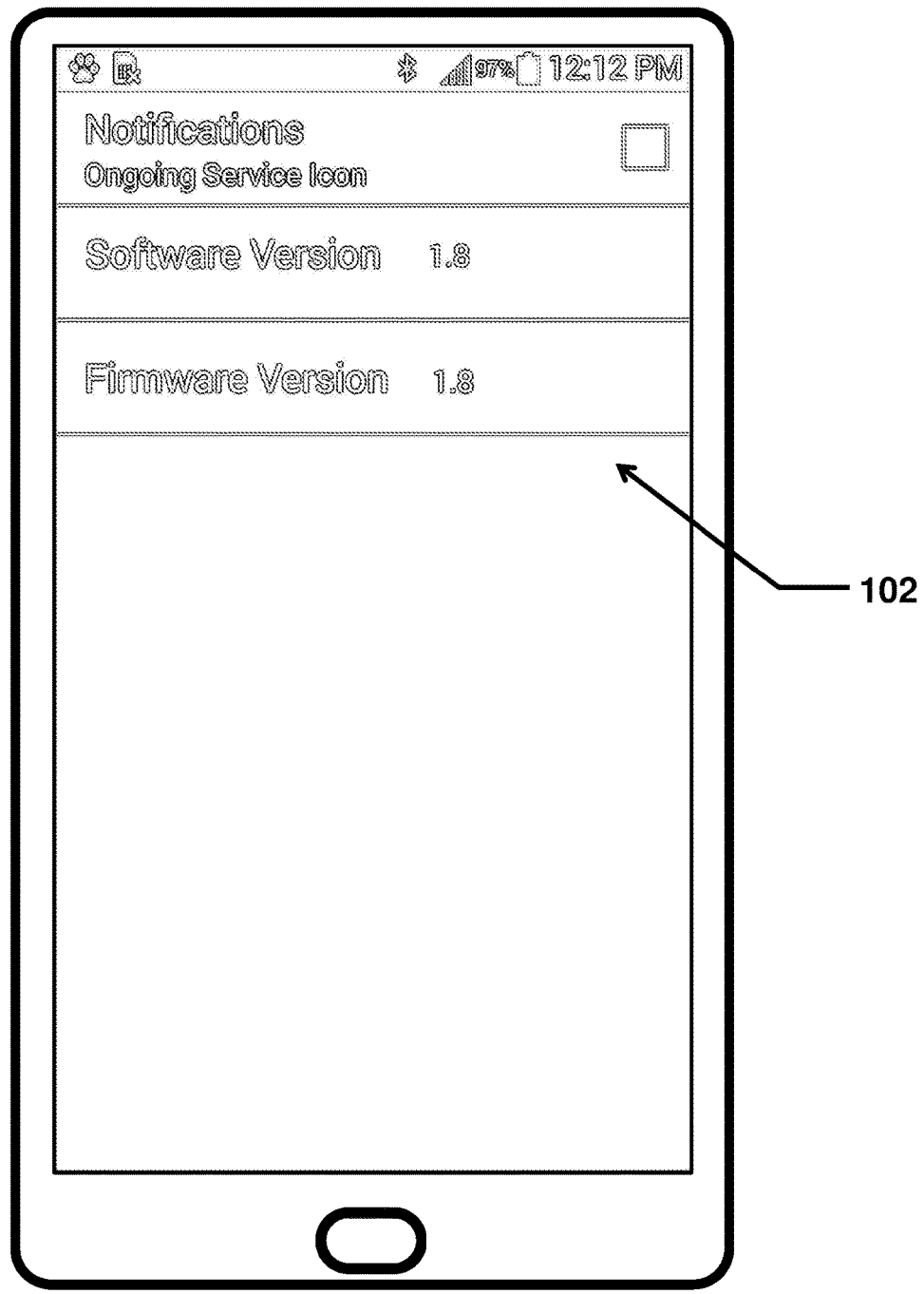
FIG. 13 is an exemplary output from a portable wireless device that communicates with the indicating device in a configuration condition.

FIG. 12 shows an exemplary output 100 through a portable wireless device. The output 100 is indicative of the user disabling the main application window and providing an input of the paw icon shown in output 98. FIG. 13 shows a further output 102 which corresponds to an output from a portable wireless device that may be provided in connection with a user setting configuration parameters for the outputs that are to be provided through the device. For example as represented in output 102, the user is enabled to select whether the service icon will be present or not during operation of the exemplary portable wireless device. Further, the exemplary output is indicative of the version of the computer executable instructions that are operative on the portable wireless device. Further in exemplary embodiments the outputs may be indicative of the status, firmware level or other information concerning the device 10. Of course as can be appreciated, additional information and outputs can be provided.

Figure 14:
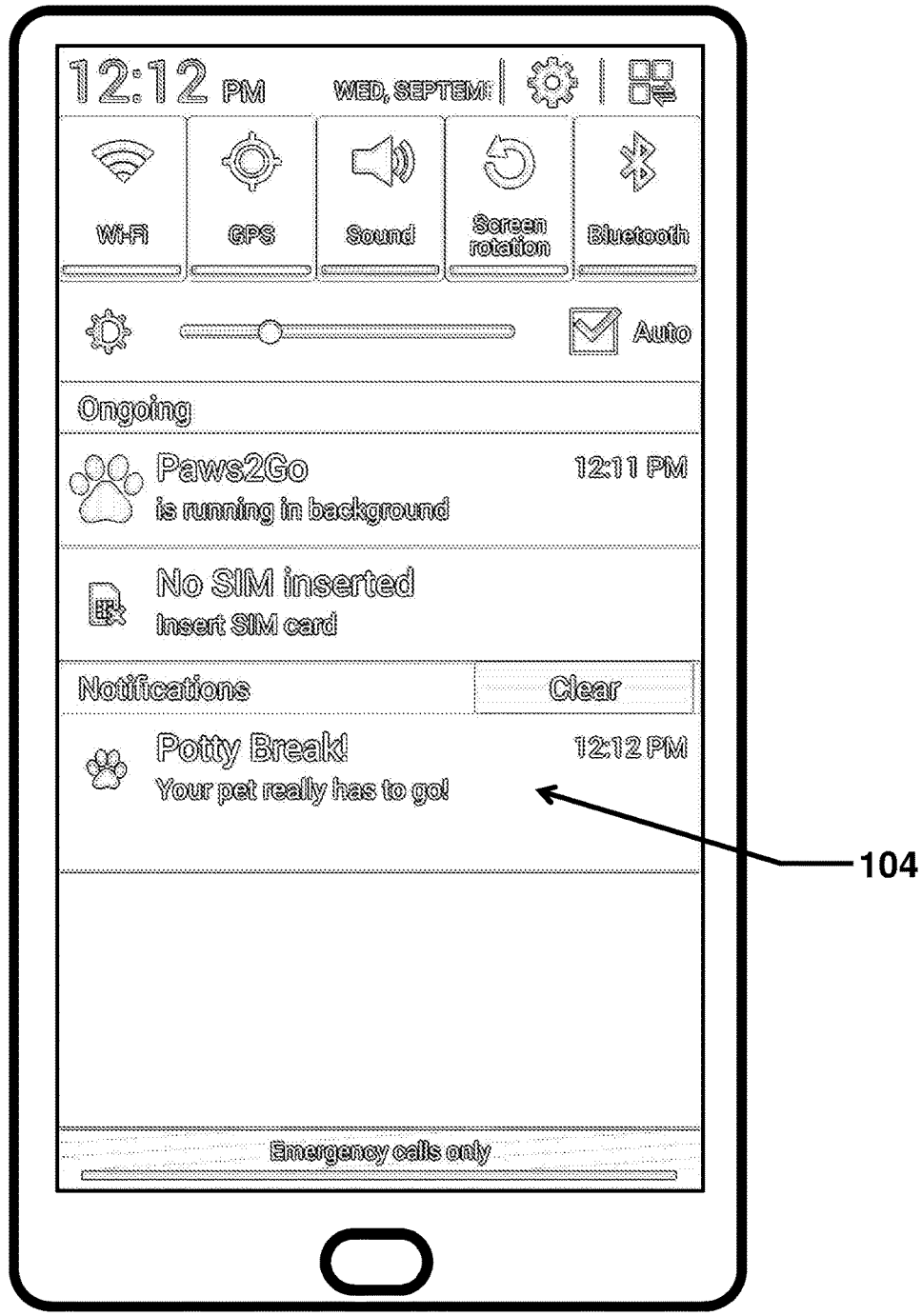
FIG. 14 is an exemplary output from a portable wireless device that provides an indication from the portable device in response to the indicating device.

FIG. 14 shows an exemplary output 104 from the portable output device which may be produced by exemplary embodiments, to provide an indication that the animal needs to go outside to perform a bodily function. As represented in the exemplary output, the text and color indications are given that the animal has made contact with the outer surface of the device 10. The visible output is provided responsive to at least one wireless RF signal that is generated by the device responsive at least in part to the contact by the animal. The output from the portable wireless device enables the user to directly or indirectly allow the animal to leave the enclosure to perform the bodily function. Of course it should be understood that these outputs are merely exemplary of numerous different output types that may be provided, and further it should be appreciated that the portable wireless device may in different arrangements be a dedicated device made specifically for use with the indicating device 10 while in other arrangements, the portable wireless device may be a multiple purpose device. Such a multipurpose device may be operative to carry out many numerous or additional functions in addition to functions related to a communication with the device 10.

It should be appreciated that in alternative embodiments, device 10 may include a lesser number of functions, other functions or additional functions. These functions may depend on the particular circumstances and animal type with which the device is used. For example in some exemplary arrangements, a device having similar circuitry and capabilities may be utilized to receive an indication from an animal of a need to be fed or other bodily function. Alternatively or in addition, other functions may be provided such as an indication given by a domesticated barnyard animal that it needs to be milked. Alternatively or in addition, animals that spend time outside may utilize the device to indicate that conditions are cold and they need to come into a shelter, are in need of food, water or other care. Numerous different functions may be carried out utilizing the principles described herein in connection with the training of numerous different animal types.

Further in exemplary arrangements, the audible and visible outputs may be utilized to facilitate the carrying out of other functions. For example illumination outputs may be suitable to illuminate a latch or other structure that an animal can actuate to enter or leave a shelter or other enclosure. Audible outputs may be used for other purposes such as calming the animal or providing the animal with instructions. In still other arrangements contact may be used to actuate devices which discourage or scare away predators.

Further while in exemplary arrangements capacitive type sensors are utilized to determine an animal contact with the device, in other embodiments other types of sensors may be utilized depending on the circumstances. Such sensors may include other types of contact or non-contact sensors. Alternative sensors may include photo sensors, sound sensors, heat sensors or other types of sensors that can detect the animal contact with the device.

Further in exemplary embodiments, the device may be combined with other functional features. Such functionality may include, for example, smoke, heat and/or carbon dioxide detection circuitry. Such circuitry may be operative to cause the device to detect such an abnormal condition indicative of a fire and provide at least one wireless signal which alerts a user of the condition through their portable wireless device. Other circuitry may be operative to detect temperature conditions such as the temperature within the enclosure. This may enable the caretaker of the animal to determine if the temperature where the animal is housed has become too hot or too cold. Other embodiments may include suitable circuitry to detect properties of the animal itself. This may include, for example, the temperature of the animal's paw, nose or other body part that has contacted the surface. Such contact may indicate that the animal has a fever or other abnormal condition and requires medical attention. Numerous other or additional principles and properties may be integrated into embodiments using the principles that have been described herein.

Figure 17:
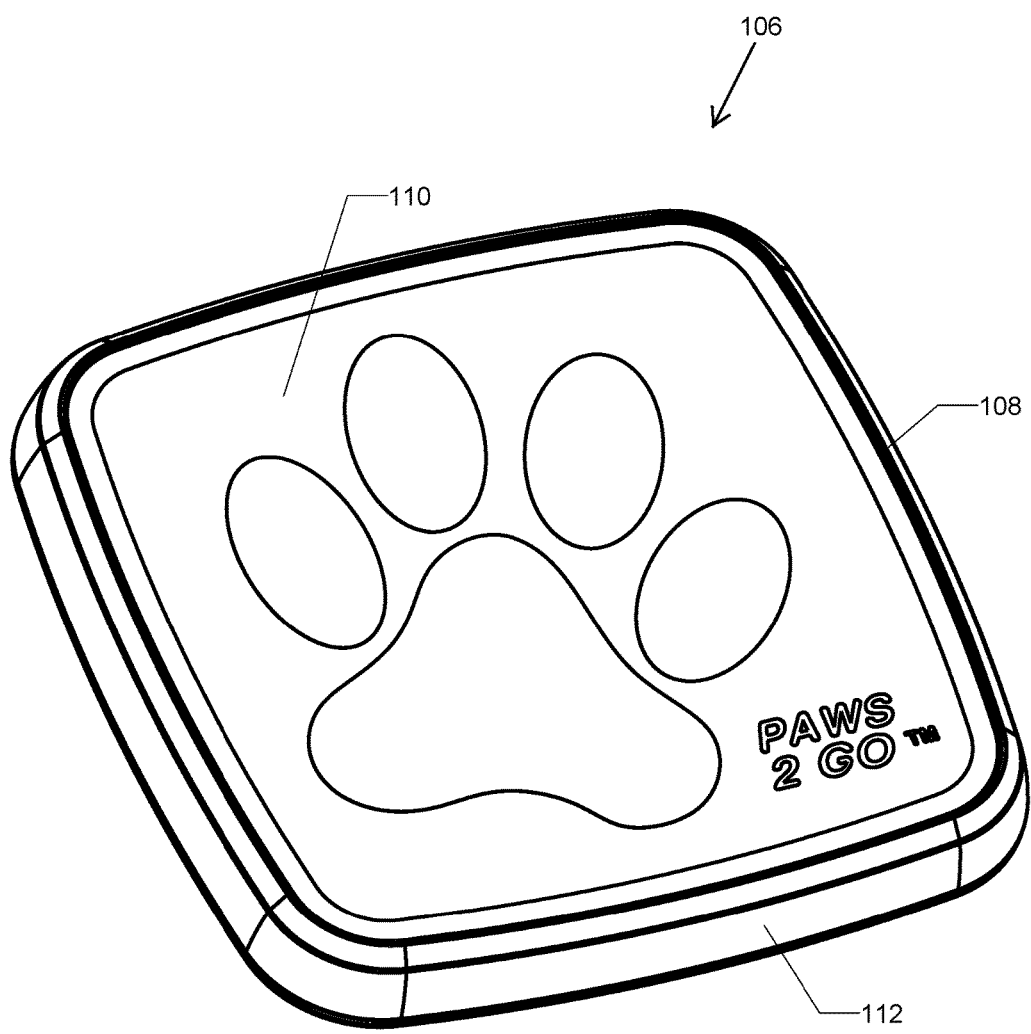
FIG. 17 is a front left perspective view of an alternative exemplary embodiment of an animal training and indicating device.
Figure 18:
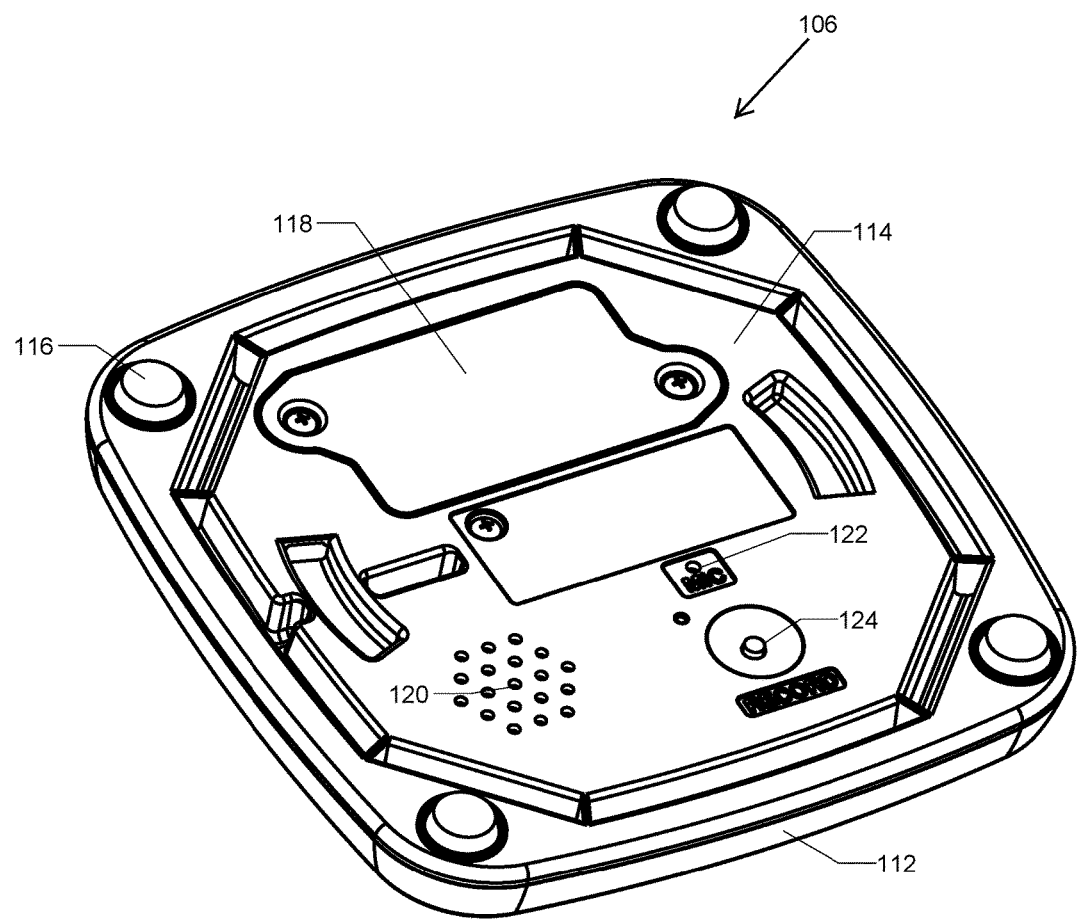
FIG. 18 is a bottom left perspective view of the embodiment shown in FIG. 15.

FIGS. 17 and 18 show an alternative embodiment of the animal training and indicating device 106. Device 106 may perform a lesser number or all of the functions described in connection with device 10. Alternatively device 106 may perform additional or different functions. Device 106 may have an alternative physical configuration to device 10 or a different stylized appearance. In exemplary arrangements, device 106 may also be configured to have a lower profile and less thickness than device 10. Of course these features are exemplary of many different configurations which devices which perform the functions that have been described may have.

Device 106 includes a housing 108. The housing 108 bounds an interior area which may include circuitry and other components similar to the embodiment previously described. The housing 108 includes an outer or upper surface 110. Outer surface 110 has sensors adjacent thereto so that contact with the outer surface by an animal can be detected. The housing 108 further includes side walls 112. Side walls 112 extend about the perimeter of the housing and extend generally transversely to the outer surface 110.

As shown in FIG. 18, the alternative device 106 includes an inner or bottom surface 114. The inner surface 114 includes a plurality of resilient feet 116. Feet 116 as in the previously described embodiment facilitate supporting the device above a surface such as a floor or away from a wall or other mounting surface so that outputs from speaker openings and such can be readily heard. In addition, the resilient feet facilitate holding the housing in engagement with the floor or a wall so that it does not readily slide or fall. Of course these approaches are exemplary.

A battery cover 118 closes an opening in the inner surface 114. The battery cover 118 is selectively removable to access the batteries that are housed in the interior area of the device. The exemplary inner surface 114 further includes speaker holes 120. The speaker holes 120 enable a speaker that is housed in the interior area of the housing to be heard outside the device. Further, as in the previously described embodiment the inner surface 114 includes a microphone opening 122 which enables a microphone housed in the interior area to receive audible signals in a manner like that previously discussed.

The exemplary device 106 further includes on its inner surface 114 an input device 124. In the exemplary embodiment the input device 124 is operated in the manner like that previously described to enable a caretaker or other user of the device to selectively record audible signals or otherwise provide inputs used in the operation of the device. In the exemplary embodiment, the input device 124 is a manually actuatable input device such as a push button. However, it should be understood that in other embodiments other types of input device including contact or contactless input devices may be utilized for purposes of providing inputs to the device.

Further it should be appreciated that alternative configurations of devices may include other or additional features. Such features may include, for example, displays, indicators, USB ports, wireless ports, keypads, NFC interfaces or other suitable devices that can be utilized for providing inputs to or receiving outputs from the device. Such components may also be used for configuration and programming of exemplary embodiments.

Further it should be appreciated that numerous different configurations may be utilized for an animal training and indicating device that performs one or more of the functions described herein. While the exemplary embodiments have been described as including a unitary tablet structure that can be supported on a floor, wall, or other support structure, other exemplary embodiments may have other configurations. Such configurations may include for example, devices which have the sensing components separate from the output devices which are used to provide visible and/or audible indications to a caretaker of the indication being provided by an animal. For example in some arrangements, having a sensor component that can be positioned separately from the indicating devices may facilitate locating the sensor in a way that is less likely to pose a tripping hazard for persons walking in proximity to the device. Further in exemplary arrangements, the separate components which comprise the device may be connected wirelessly so as to enable the indicating devices associated with the sensing device to be located remotely therefrom without the need for wired connections. Alternatively or in addition, exemplary arrangements may include multiple output devices located remotely from each other such that a caretaker may receive an audible or visual indication that the animal has made contact with the device, while the caretaker is in multiple locations within a building or facility. Of course it should be understood that these approaches are exemplary and in other embodiments, other approaches may be used.

Thus the exemplary embodiments achieve improved operation, eliminate difficulties encountered in the use of prior devices and systems, and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the invention is not limited to the features shown and described.

Further in the following claims, any feature described as a means for performing a function shall be construed as encompassing any means known to those skilled in the art as being capable of carrying out the recited function and shall not be deemed limited to the particular means shown or described for performing the recited function in the foregoing description or mere equivalents thereof.

It should be understood that features and/or relationships associated with one described embodiment can be combined with features and/or relationships from another described embodiment. That is, various features and/or relationships from various embodiments can be combined in further embodiments. The inventive scope of the disclosure is not limited to only the embodiments shown or described herein.

Having described the features, discoveries and principles of the exemplary embodiments, the manner in which they are constructed and operated, and the advantages and useful results attained, the new and useful structures, devices, elements, arrangements, parts, combinations, systems, equipment, operations, methods, processes and relationships are set forth in the appended claims.

We claim:

1. Apparatus comprising:
a housing, wherein the housing bounds an interior area and includes an outer surface,
a capacitive sensor, wherein the capacitive sensor is in operative connection with the housing,
wherein the capacitive sensor is configured to detect at least one of a paw or nose of an animal in contact with the outer surface, wherein the animal has been trained to make the contact responsive to the animal having a need,
a light emitter, wherein the light emitter is in operative connection with the housing, wherein the light emitter is selectively operative to illuminate, wherein illumination of the light emitter is visible externally of the housing,
an audio speaker, wherein the speaker is in operative connection with the housing, wherein the speaker is selectively operative to provide audible outputs that are perceivable externally of the housing,
at least one circuit, wherein the at least one circuit extends in the interior area
wherein the at least one circuit is in operative connection with the capacitive sensor, the light emitter and the speaker,
wherein the at least one circuit is operative responsive to the capacitive sensor to detect a contact of the paw or nose of the animal with the outer surface, and responsive at least in part to the detection, the at least one circuit is operative to cause
the light emitter to illuminate for an illumination time period after the contact,
the speaker to provide an audible output for a sounding time period after the contact,
wherein the animal is enabled to selectively provide an indication via contact with the housing of the need to a human caretaker in proximity to the housing through caretaker observable illumination of the light the light emitter and perceivable audible output from the speaker.

2. The apparatus according to claim 1 and further comprising:
a microphone, wherein the microphone is in operative connection with the housing, wherein the microphone is in operative connection with the at least one circuit,
at least one input device, wherein the at least one input device is in operative connection with the microphone and the at least one circuit,
wherein the at least one circuit is operative responsive at least in part to at least one input through the input device to enable the at least one circuit to capture audible signals through the microphone and to store audio data corresponding to the audible signals in a data store of the at least one circuit, wherein the audible output is produced responsive at least in part to the audio data.

3. The apparatus according to claim 2
wherein the at least one input device includes a manually actuatable input device.

4. The apparatus according to claim 2
wherein the housing further includes at least one sidewall, wherein the at least one sidewall extends transverse to the outer surface,
a inner surface, generally opposed of the outer surface, wherein the microphone and the speaker are within the interior area and are accessible through one or more openings in the inner surface,
wherein the housing includes no openings to the interior area other than through the inner surface.

5. The apparatus according to claim 2
wherein the light emitter includes at least one multicolor light emitter,
wherein a color of illumination of the light emitter is selectable responsive at least in part to at least one input through the at least one input device.

6. The apparatus according to claim 2
wherein the illumination device is in the interior area,
and further comprising at least one light pipe, wherein the at least one light pipe is in operative connection with the light emitter,
wherein the at least one light pipe is operative when the light emitter is illuminated to conduct light from the light emitter to at least one external surface of the housing.

7. The apparatus according to claim 2
wherein at least one of the illumination time period and the sounding time period is variable responsive at least in part to at least one input through the at least one input device.

8. The apparatus according to claim 1
wherein the housing is positioned within an enclosure,
wherein the at least one circuit includes an RF transceiver,
wherein the transceiver is operative to receive at least one further RF signal from a further device positioned outside the enclosure, wherein the further device is operative to send the at least one further RF signal responsive at least in part to a further contact of the animal with the further device, wherein the animal has been trained to make the further contact with the further device when the animal needs to return to the enclosure, wherein the at least one circuit is operative responsive at least in part to the at least one further signal to cause the illumination device to further illuminate and the speaker to provide a further audible output, wherein the apparatus provides further indications to the caretaker that the animal needs to return to the enclosure and the caretaker may allow the animal to return to the enclosure.

9. The apparatus according to claim 8
wherein at least one of the further illumination and the further audible output produced responsive to the at least one further RF signal, differs from the illumination and audible output produced in response to the contact.

10. The apparatus according to claim 8
wherein the transceiver is operative to send RF wireless signals corresponding to the further contact.

11. The apparatus according to claim 1
wherein the at least one circuit includes an RF transmitter, wherein the RF transmitter is operative to produce at least one RF wireless signal indicative of the contact, and further comprising:
a portable wireless device,
  wherein the portable wireless device includes a portable output device and a portable wireless RF receiver,
wherein the portable wireless device is operative responsive at least in part to receipt of the at least one RF wireless signal to output through the portable output device, an indication of the contact.

12. The apparatus according to claim 2
and further comprising:
a mounting bracket, and
at least one interengaging projection and recess,
  wherein the at least one projection is in operative fixed connection with one of the mounting bracket and the inner surface,
  and the at least one recess is in operative fixed connection with the other of the mounting bracket and the inner surface,
wherein the at least one interengaging projection and recess are releasibly engageable, wherein the mounting bracket is in operative engagement with the housing when the at least one projection and at least one recess are engaged.

13. Apparatus comprising:
a portable wireless device, wherein the portable wireless device includes
a portable output device, and
a portable RF receiver,
wherein the portable wireless device is operative to receive at least one RF wireless signal from a remote device positioned in an interior area of an enclosed structure in which an animal is housed, wherein the remote device includes
a housing,
a capacitive sensor,
at least one circuit, wherein the at least one circuit includes an RF wireless transmitter, wherein the remote device is operative to cause output of the at least one wireless RF signal responsive to a contact of a nose or paw of the animal with at least a portion of the housing which contact is detectable by the capacitive sensor, wherein the animal has been trained to make the contact in response to the animal having a need to leave the interior area of the enclosed structure to perform a bodily function including at least one of urination and defecation, outside the interior area, wherein the portable device is operative responsive at least in part to the at least one wireless RF signal to produce through the portable output device, an indication that the animal needs to go outside the interior area of the enclosed structure to perform the bodily function.

14. The apparatus according to claim 13 and further comprising:
the remote device, wherein the remote device further includes
a light emitter, and
an audio speaker,
wherein the light emitter is operative to illuminate and the audible speaker is operative to provide at least one audible output responsive at least in part to the contact, which illumination and audible output are preceivable by both the animal and a human animal caretaker within the interior area 14 such that through the contact the animal is enabled to provide visible and audible indications of the need to leave the interior area to perform the bodily function to the caretaker, whereby the caretaker in response to the indications may release the animal from the interior area.

15. The apparatus according to claim 13
wherein the enclosed structure includes a door, wherein the door is openable responsive to at least one further RF wireless signal,
wherein the portable device includes a user input device,
wherein the portable device is operative responsive at least in part to receipt of at least one user input through the user input device, to cause generation of the at least one further RF wireless signal, whereby the animal is enabled to leave the interior area.

16. Apparatus comprising:
a housing, wherein the housing bounds an interior area and includes an outer surface,
a capacitive sensor, wherein the capacitive sensor is in operative connection with the housing,
  wherein the capacitive sensor is configured to detect at least one of a paw or nose of an animal in contact with the outer surface,
a light emitter, wherein the light emitter is in operative connection with the housing, wherein the light emitter is selectively operative to illuminate, wherein illumination of the light emitter is visible externally of the housing,
an audio speaker, wherein the speaker is in operative connection with the housing,
wherein the speaker is selectively operative to provide audible outputs that are perceivable externally of the housing,
a microphone, wherein the microphone is in operative connection with the housing,
at least one input device,
at least one battery, wherein the at least one battery extends in the interior area, wherein the at least one battery produces a rated output voltage, at least one circuit, wherein the at least one circuit extends in the interior area,
  wherein the at least one circuit is in operative connection with the capacitive sensor, the at least one battery, the at least one input device, the microphone, the light emitter and the audio speaker,
  wherein the at least one circuit includes at least one Low Drop Out (LDO) regulator and a microcontroller, wherein the at least one LDO regulator is in operative connection with the at least one battery and microcontroller,
  wherein the at least one LDO regulator is operative to supply the microcontroller at a reduced voltage, wherein the reduced voltage is lower than the rated output voltage,
  wherein the at least one circuit is operative responsive at least in part to at least one input through the input device to enable the at least one circuit to capture audible signals through the microphone and to store audio data corresponding to the audible signals in a data store of the at least one circuit,
  wherein the at least one circuit is operative responsive at least in part to the capacitive sensor to detect a contact of a paw or nose of an animal with the outer surface, and responsive at least in part to the detection, the at least one circuit is operative to cause,
    the light emitter to illuminate for an illumination time period after the contact,
    the speaker to provide an audible output corresponding at least in part to the stored audio data, for a sounding time period after the contact,
  whereby the animal is enabled to provide an indication of an animal condition to an animal caretaker via the contact with the housing.

17. The apparatus according to claim 16
wherein the capacitive sensor includes at least one contact detect IC in operative connection with at least one electrode, wherein the at least one contact detect IC is in operative connection with the microcontroller and the at least one LDO regulator,
wherein the at least one contact detect IC is powered at the reduced voltage.

18. The apparatus according to claim 16
wherein the light emitter is in operative connection with the at least one battery, and wherein the light emitter is illuminated responsive to application of the rated output voltage.

19. The apparatus according to claim 16
wherein the at least one circuit includes a sound chip,
  wherein the sound chip is in operative connection with the speaker and the microphone,
wherein the sound chip is in further operative connection with the microcontroller and the at least one battery,
wherein the sound chip is operative responsive at least in part to application of the rated output voltage to at least one of capture audible signals and provide the audible output.

20. The apparatus according to claim 16
wherein the at least one battery output voltage falls over time from the rated output voltage,
wherein the at least one circuit includes a power control circuit, wherein the power control circuit includes the LDO regulator,
wherein the power control circuit is operative to supply the reduced voltage until the battery output voltage falls below the reduced voltage, and thereafter as battery voltage falls below the reduced voltage, the power control circuit supplies the battery output voltage instead of the reduced voltage.

21. The apparatus according to claim 16
wherein the at least one circuit includes an RF wireless transmitter, wherein the transmitter is operative to output at least one wireless RF signal indicative of the contact.

22. Apparatus comprising:
a housing, wherein the housing bounds an interior area and includes an outer surface,
a capacitive sensor, wherein the capacitive sensor is in operative connection with the housing,
  wherein the capacitive sensor is configured to detect at least one of a paw or nose of an animal in contact with the outer surface,
a light emitter, wherein the light emitter is in operative connection with the housing, wherein the light emitter is selectively operative to illuminate, wherein illumination of the light emitter is visible externally of the housing,
an audio speaker, wherein the speaker is in operative connection with the housing,
wherein the speaker is selectively operative to provide audible outputs that are perceivable externally of the housing,
a microphone, wherein the microphone is in operative connection with the housing,
at least one input device,
at least one circuit, wherein the at least one circuit extends in the interior area,
  wherein the at least one circuit is in operative connection with the capacitive sensor, the at least one input device, the microphone, the light emitter and the audio speaker,
  wherein the at least one circuit includes,
    at least one clock circuit,
    at least one data store, and
    an RF wireless transceiver,
  wherein the at least one circuit is operative responsive to at least in part to at least one input through the input device to enable the at least one circuit to capture audible signals through the microphone and to store audio data corresponding to the audible signals in a data store of the at least one circuit,
  wherein the at least one circuit is operative responsive at least in part to the capacitive sensor to detect a contact of a paw or nose of an animal with the outer surface, and responsive at least in part to the detection, the at least one circuit is operative to cause
    the light emitter to illuminate for an illumination time period after the contact,
    the speaker to provide an audible output corresponding at least in part to the stored audio data, for a sounding time period after the contact, whereby the animal enabled to provide an indication of an animal condition to an animal caretaker via the contact with the housing,
  wherein the at least one circuit is operative responsive at least in part to the at least one clock circuit to determine a contact time corresponding to the contact,
  wherein the at least one circuit is operative to cause the at least one data store to include event data corresponding to the contact and the contact time,
  wherein the transceiver is selectively operative to transmit signals corresponding to the event data.

23. Apparatus comprising:
a housing, wherein the housing bounds an interior area and includes an outer surface, wherein the housing is configured to be positioned within an interior area of an enclosure which houses an animal and at least one human animal caretaker,
a contact sensor, wherein the contact sensor is in operative connection with the housing,
wherein the contact sensor is configured to detect at least one of a paw or nose of an animal in contact with the outer surface,
a light emitter, wherein the light emitter is positioned within the interior area, wherein the light emitter is selectively operative to illuminate and illumination of the light emitter is visible externally of the housing,
an audio speaker, wherein the speaker is positioned in the interior area,
wherein the speaker is selectively operative to provide audible outputs that are perceivable externally of the housing,
at least one circuit, wherein the at least one circuit extends in the interior area
wherein the at least one circuit is in operative connection with the contact sensor, the light emitter and the speaker,
wherein the at least one circuit is operative to detect a contact by a paw or nose of the animal with the outer surface, wherein the animal has been trained to make the contact when the animal needs to carry out a bodily function including at least one of urination and defecation, outside of the interior area of the enclosure, and responsive at least in part to the detection, the at least one circuit is operative to cause
the light emitter to illuminate for an illumination time period after the contact,
the speaker to provide an audible output for a sounding time period after the contact,
wherein the light illumination and the audible outputs are perceivable by both the animal and the human caretaker within the interior area, such that through the contact the animal is enabled to provide visual and audible indications to the caretaker of the need to leave the interior area of the enclosure to perform the bodily function, whereby the caretaker in response to the indications may release the animal from the enclosure.

24. The apparatus according to claim 23
wherein the at least one circuit includes an RF transmitter, wherein the RF transmitter is operative to produce at least one RF wireless signal indicative of the contact,
and further comprising:
a portable wireless device, wherein the portable wireless device includes a portable output device and a portable wireless RF receiver,
wherein the portable wireless device is operative responsive at least in part to receipt of the at least one wireless RF signal to output through the portable output device an indication that the animal needs to go outside of the interior area to perform the bodily function.

25. The apparatus according to claim 20 and further comprising:
a mounting bracket,
wherein the mounting bracket includes a pair of disposed projecting tabs,
wherein the inner surface includes a pair of disposed slots, wherein each slot is configured to releasably engage a respective tab therein,
wherein the housing is held in engagement with the mounting bracket through engagement of each respective tab with a respective slot.

\* \* \* \* \*